United States Patent
Ornella et al.

(10) Patent No.: US 10,464,409 B2
(45) Date of Patent: Nov. 5, 2019

(54) HYDRAULIC HYBRID POWERTRAIN

(71) Applicant: DANA ITALIA SPA, Arco (IT)

(72) Inventors: Giulio Ornella, Arco (IT); Fabrizio Zendri, Rovereto (IT); Lorenzo Serrao, Nago-Torbole (IT); Ettore Cosoli, Padua (IT)

(73) Assignee: Dana Belgium, N.V., Bruges (BE)

( * ) Notice: Subject to any disclaimer, the term of this patent is extended or adjusted under 35 U.S.C. 154(b) by 384 days.

(21) Appl. No.: 15/308,863

(22) PCT Filed: May 11, 2015

(86) PCT No.: PCT/EP2015/060389
§ 371 (c)(1),
(2) Date: Nov. 4, 2016

(87) PCT Pub. No.: WO2015/173202
PCT Pub. Date: Nov. 19, 2015

(65) Prior Publication Data
US 2017/0072778 A1    Mar. 16, 2017

Related U.S. Application Data

(60) Provisional application No. 61/992,977, filed on May 14, 2014, provisional application No. 61/994,573, filed on May 16, 2014.

(30) Foreign Application Priority Data

Dec. 30, 2014    (EP) .................................... 14425160

(51) Int. Cl.
*F16H 37/02* (2006.01)
*F16H 3/093* (2006.01)
(Continued)

(52) U.S. Cl.
CPC ................ *B60K 6/12* (2013.01); *B60K 25/06* (2013.01); *F16H 61/4096* (2013.01);
(Continued)

(58) Field of Classification Search
CPC ........... F16H 37/021; F16H 2003/0931; F16H 2003/007; F16H 2003/008
(Continued)

(56) References Cited

U.S. PATENT DOCUMENTS

| 6,170,587 B1* | 1/2001 | Bullock | B60K 6/12 180/69.6 |
| 7,793,496 B2* | 9/2010 | Rampen | B60K 6/12 60/414 |

(Continued)

FOREIGN PATENT DOCUMENTS

| CN | 101909962 B | 11/2013 |
| CN | 103703191 A | 4/2014 |

(Continued)

OTHER PUBLICATIONS

European Patent Office, International Search Report and Written Opinion issued in PCT/EP2015/060389, dated Sep. 28, 2015, 10 pages, European Patent Office, Rijswijk, Netherlands.
(Continued)

*Primary Examiner* — Ha Dinh Ho
(74) *Attorney, Agent, or Firm* — Marshall & Melhorn, LLC

(57) ABSTRACT

A hydraulic hybrid powertrain for a vehicle is disclosed. The powertrain has an internal combustion engine selectively drivingly engaged with an input of a stepped-ratio transmission through a torque converter and through a speed direction changing device. An output of the stepped-ratio transmission is selectively drivingly engaged with a vehicle output. An intermediate gear set is drivingly engaged with
(Continued)

the speed direction changing device and drivingly engaged with the input of the stepped-ratio transmission. A hydraulic machine in fluid communication with a hydraulic accumulator assembly, a transmission shaft of the hydraulic machine being drivingly engaged or selectively drivingly engaged with the intermediate gear set for providing energy to the intermediate gear set and for absorbing energy from the intermediate gear set. Also disclosed are methods of operating the hydraulic hybrid powertrain.

15 Claims, 16 Drawing Sheets

(51) Int. Cl.
    *F16H 3/00*     (2006.01)
    *B60K 6/12*     (2006.01)
    *B60K 25/06*     (2006.01)
    *F16H 61/4096*     (2010.01)
    *F16H 61/421*     (2010.01)
    *B60K 25/02*     (2006.01)

(52) U.S. Cl.
    CPC ...... *F16H 61/421* (2013.01); *B60K 2025/022* (2013.01); *B60Y 2200/22* (2013.01); *B60Y 2200/221* (2013.01); *B60Y 2200/222* (2013.01); *B60Y 2200/41* (2013.01); *B60Y 2200/412* (2013.01); *B60Y 2200/415* (2013.01); *Y02T 10/6208* (2013.01)

(58) Field of Classification Search
    USPC .................................................. 74/661, 335
    See application file for complete search history.

(56) References Cited

U.S. PATENT DOCUMENTS

| | | | |
|---|---|---|---|
| 7,841,432 B2 * | 11/2010 | Lynn ........................ | B60K 6/12 180/65.21 |
| 7,921,950 B2 * | 4/2011 | Harris ...................... | B60K 6/48 180/65.6 |
| 8,353,804 B2 | 1/2013 | Versteyhe et al. | |
| 8,360,180 B2 | 1/2013 | Hoff et al. | |
| 8,606,448 B2 | 12/2013 | Anders et al. | |
| 8,978,798 B2 | 3/2015 | Dalum et al. | |
| 2009/0107744 A1 * | 4/2009 | Foersterling ............. | B60K 6/12 180/65.225 |
| 2010/0012052 A1 | 1/2010 | Anz et al. | |
| 2014/0256505 A1 | 9/2014 | Dalum et al. | |

FOREIGN PATENT DOCUMENTS

| | | |
|---|---|---|
| DE | 102012005594 A1 | 9/2013 |
| EP | 2039554 A2 | 3/2009 |
| JP | 2009257389 A | 11/2009 |
| WO | 2009/088406 A2 | 7/2009 |

OTHER PUBLICATIONS

European Patent Office, Extended European Search Report issued in EP14425160.0, dated Jul. 29, 2015, 6 pages, European Patent Office, Munich, Germany.

Japanese Patent and Trademark Office, Japanese Office Action in Application No. 2016-564151, dated Feb. 12, 2019, 9 pages.

* cited by examiner

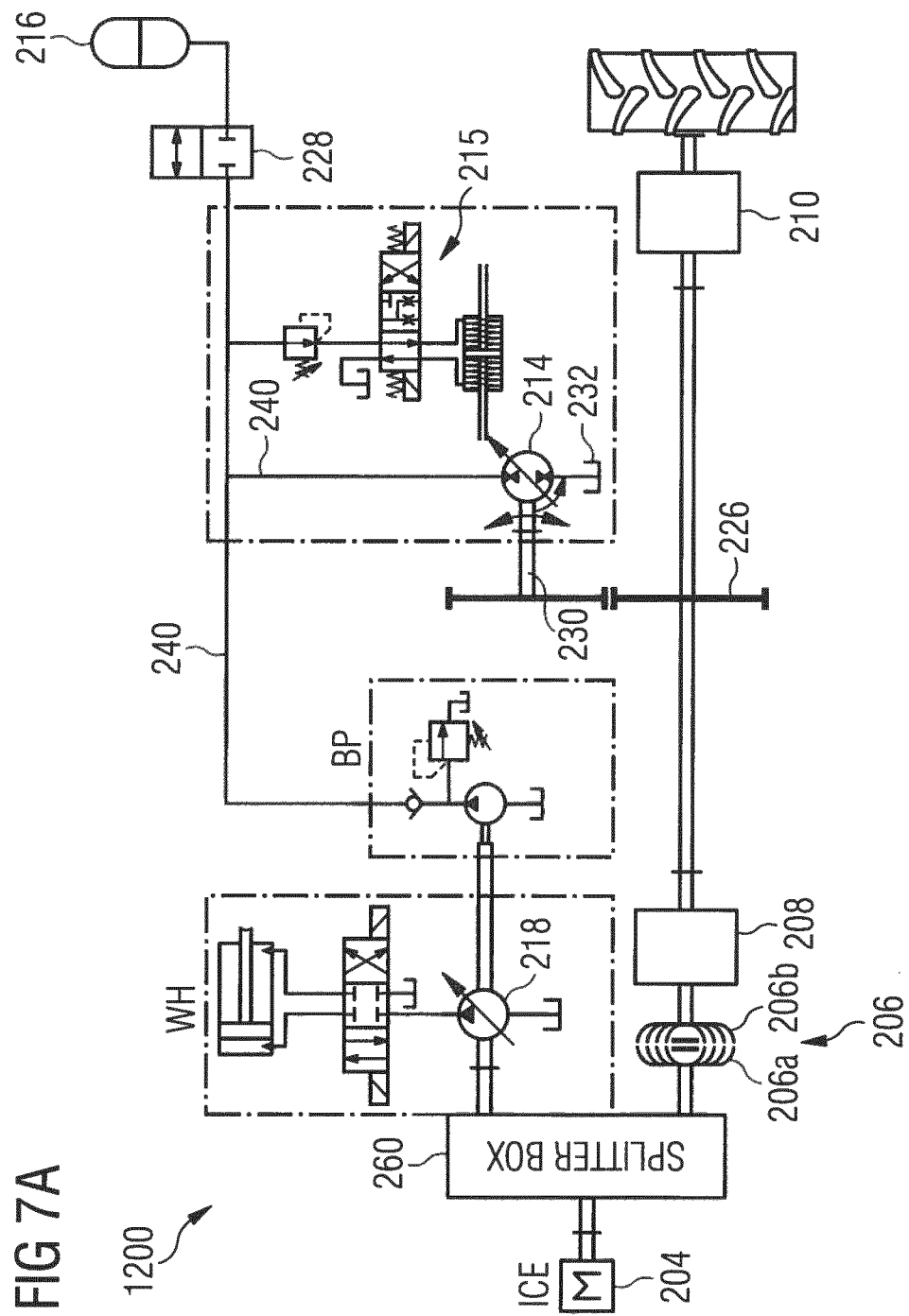

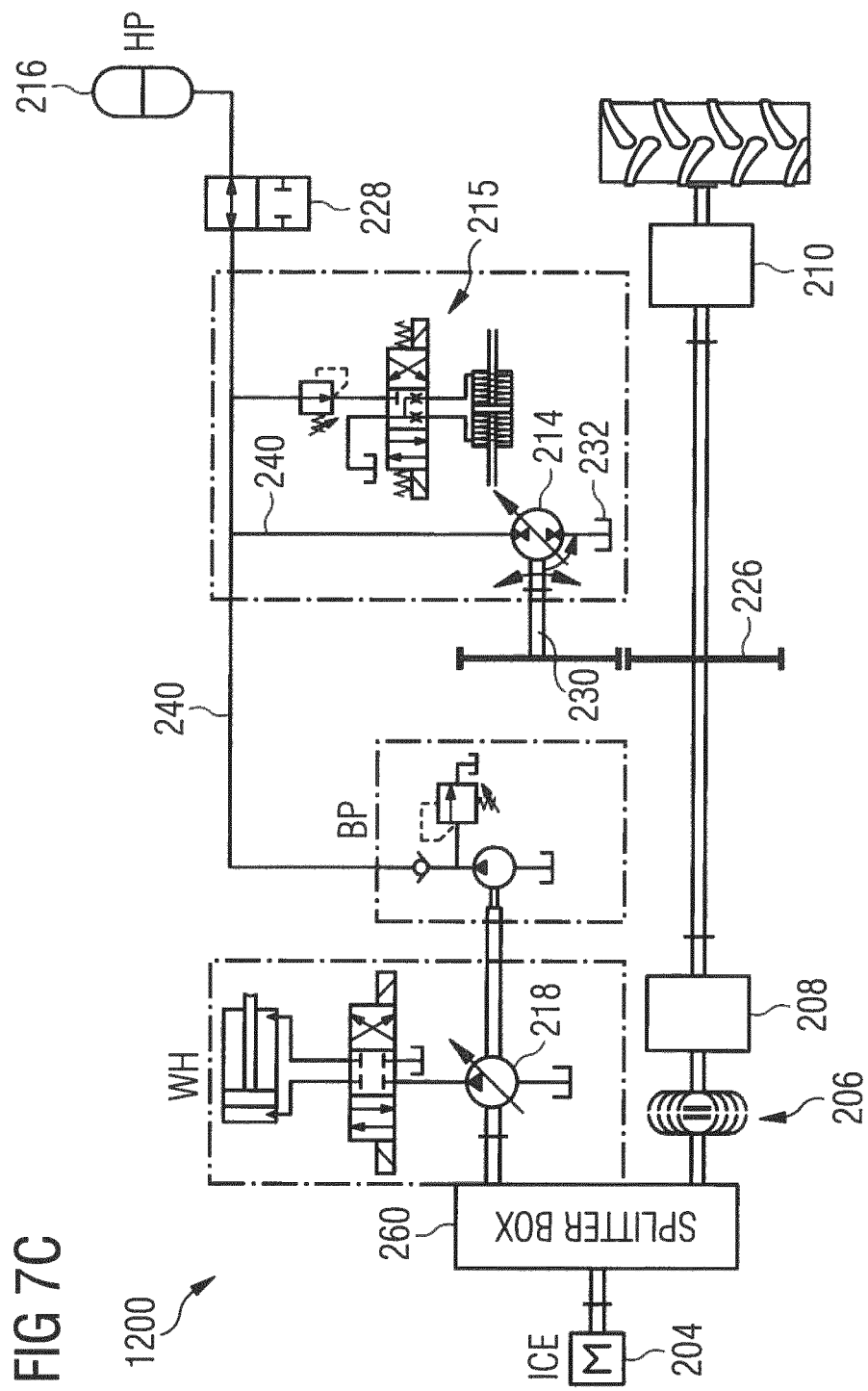

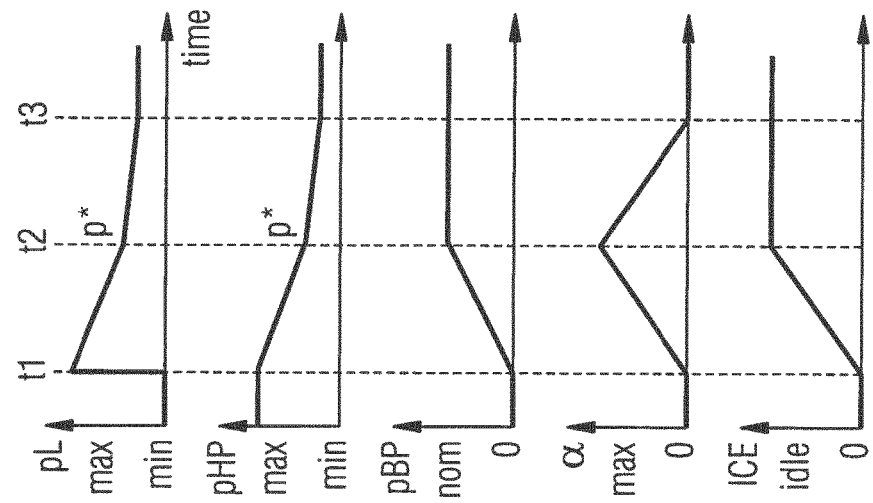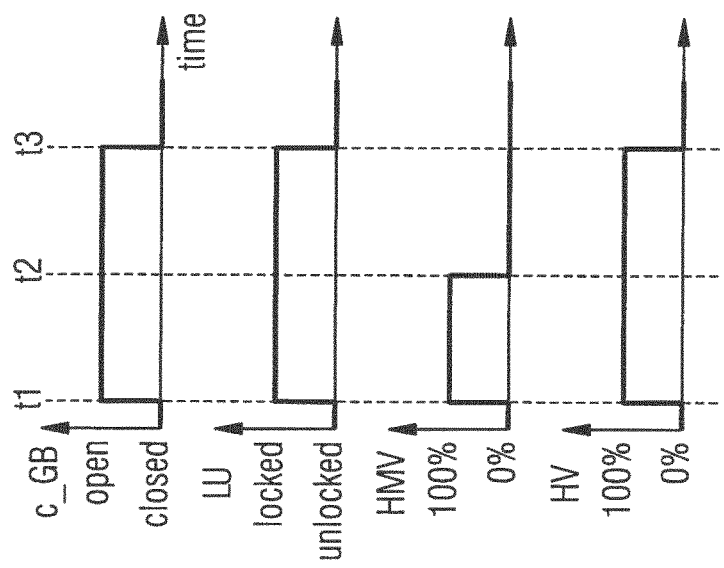

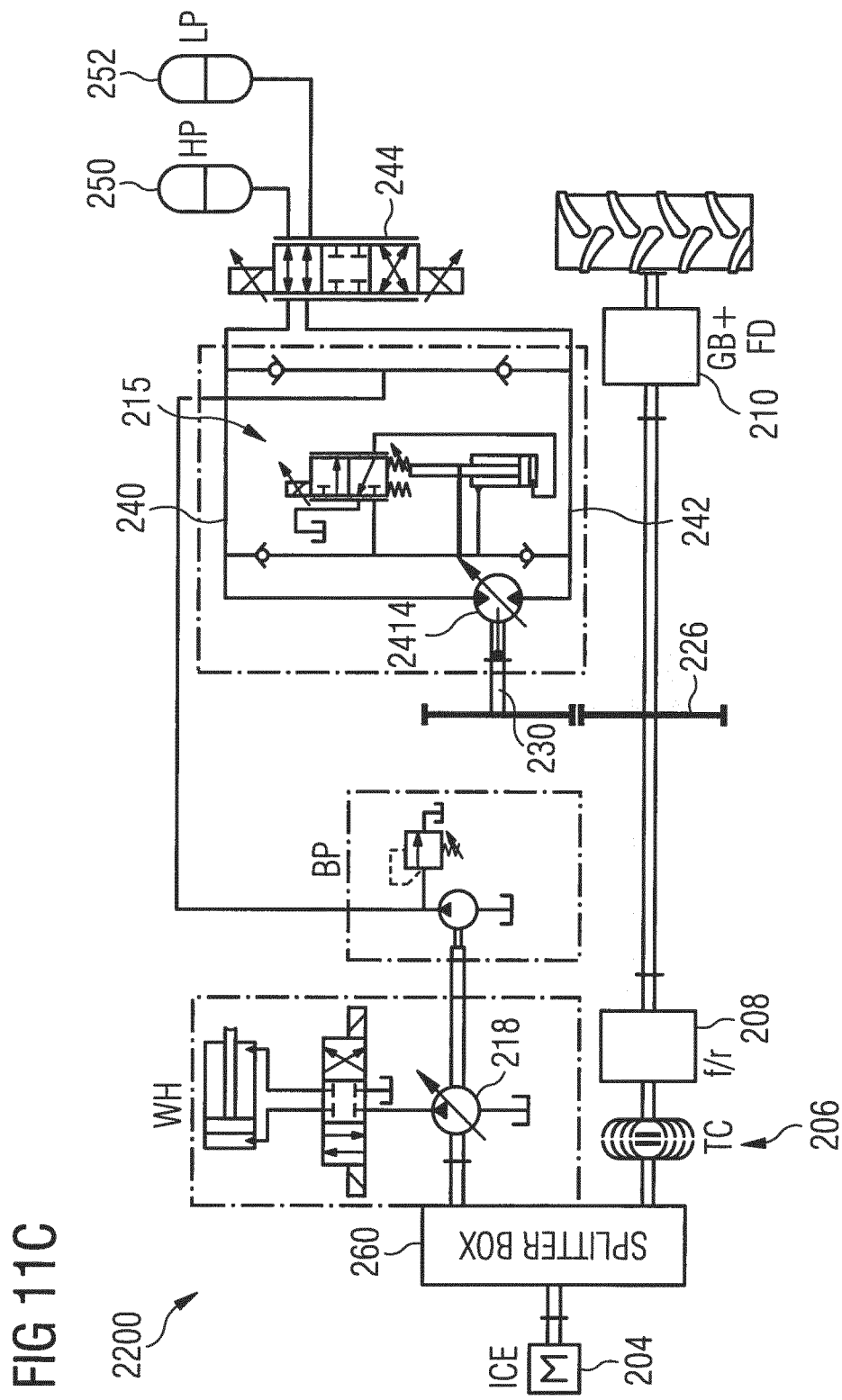

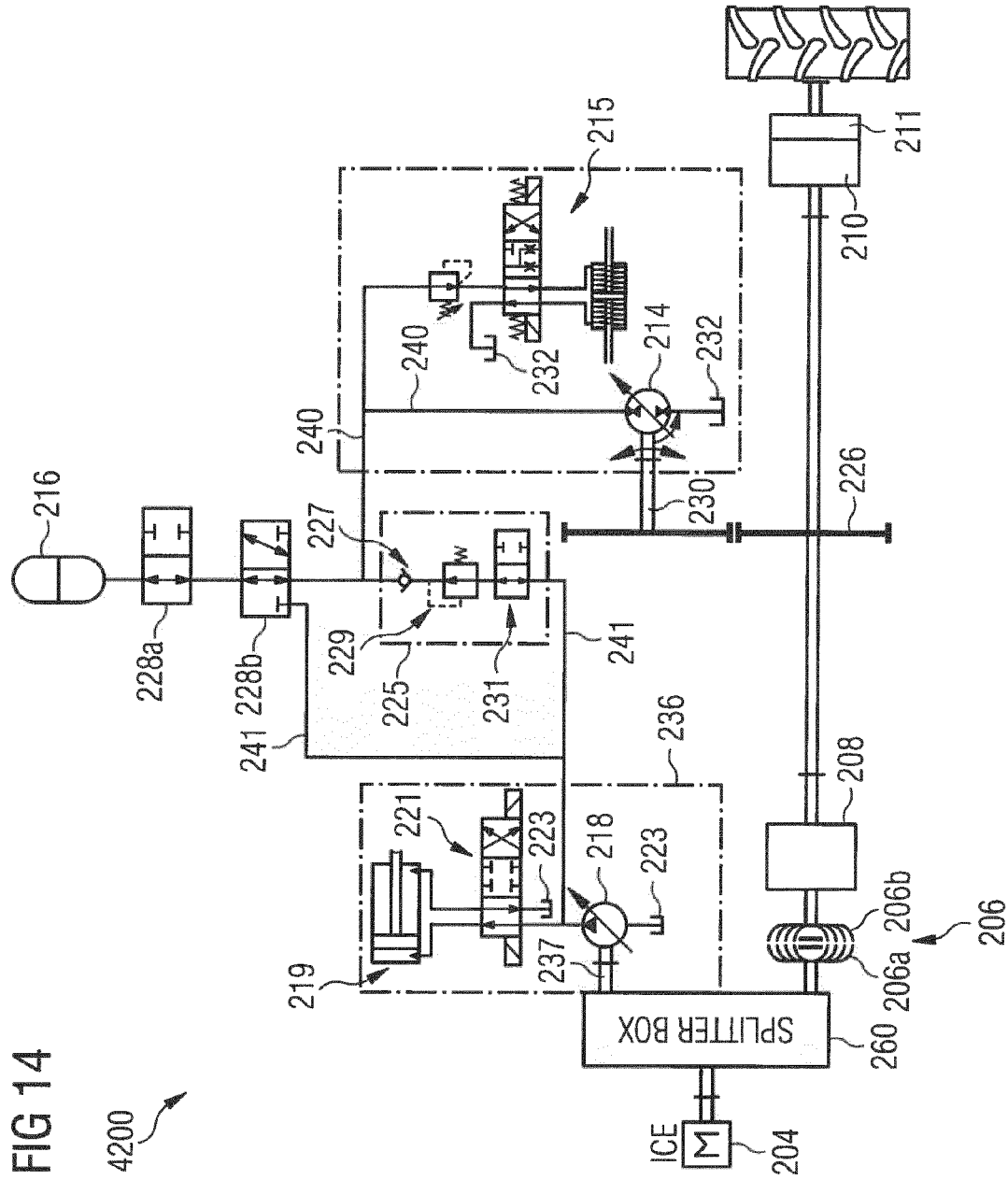

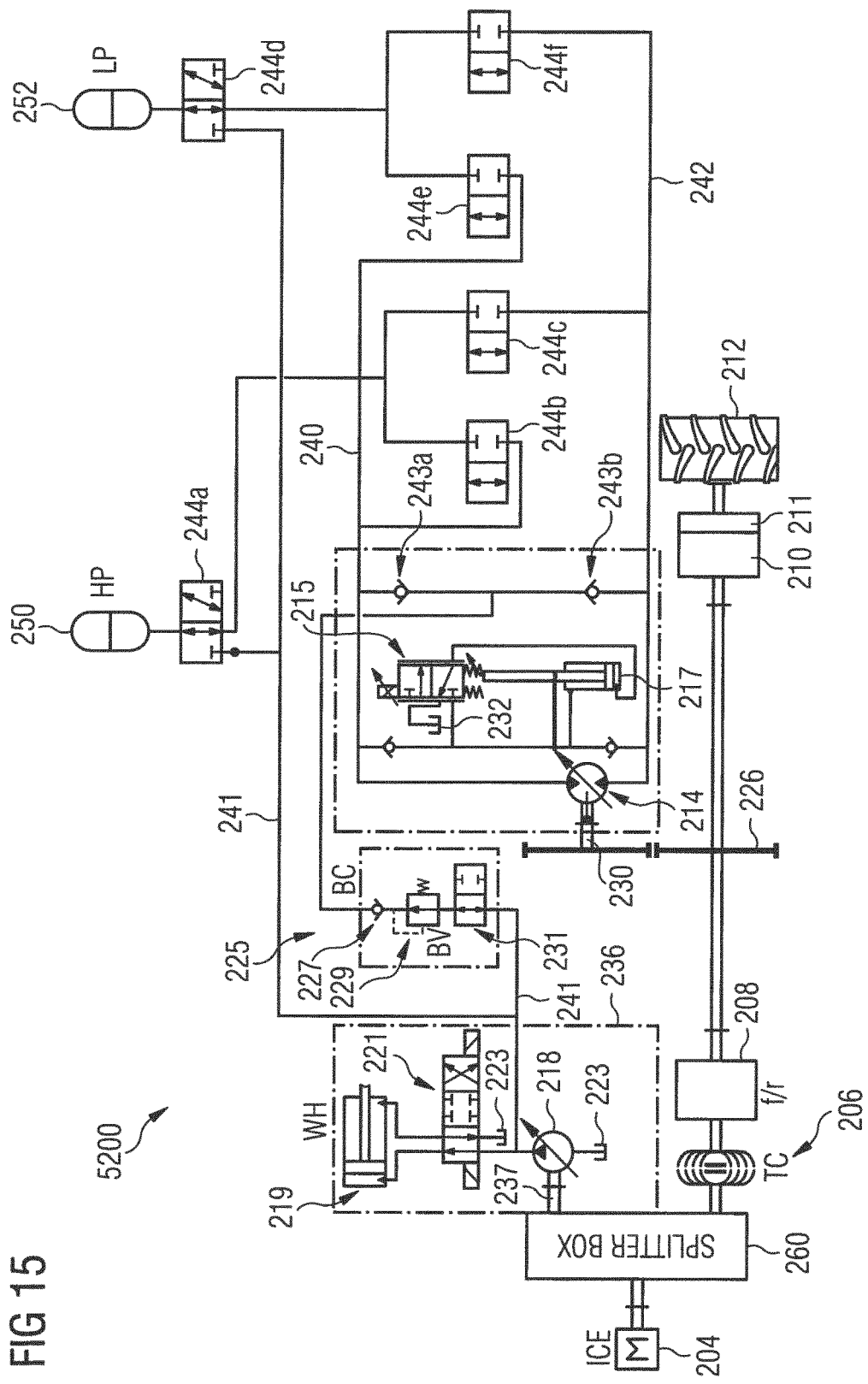

ative source of energy, is placed between an engine and a transmission; and a post-transmission parallel hybrid architecture, where a secondary machine, powered by an alternative source of energy, is placed between a transmission and a ground engaging portion of the powertrain.

HYDRAULIC HYBRID POWERTRAIN

BACKGROUND OF THE INVENTION

The present application relates primarily to a hydraulic hybrid powertrain for a vehicle and to various methods of operating said hydraulic hybrid powertrain.

A hybrid vehicle may be equipped with a secondary energy storage system on board, in addition to a fuel tank. The secondary energy storage system enables additional degrees of freedom in the generation of tractive power and adds the ability to regenerate energy during braking, allowing the subsequent reuse of the stored energy. As a result, fuel consumption may be reduced or vehicle performance may be increased. In an electric hybrid system, energy is stored in electrochemical batteries or supercapacitors, and a secondary machine is an electric motor.

Several hybrid architectures and technologies exist, suited to different applications: among these, series, parallel, and power-split architectures are the most common.

A parallel hybrid powertrain is characterized by a mechanical coupling of the engine and the secondary machine, which allows both to provide torque to a ground engaging portion of the powertrain. Based on the location of a torque summation node, the following categories of parallel hybrid architecture are normally distinguished: a pre-transmission parallel hybrid architecture, where a secondary machine, powered by an alternative source of energy, is placed between an engine and a transmission; and a post-transmission parallel hybrid architecture, where a secondary machine, powered by an alternative source of energy, is placed between a transmission and a ground engaging portion of the powertrain.

Additionally, a third solution is possible which includes placing an electric motor at an intermediate position in the transmission, as described in U.S. Pat. No. 8,353,804 B2 and as shown in FIG. 1, which introduces a hybrid transmission where both an electric motor and an engine are connected to an off-highway, power shifting transmission. The electric motor is mechanically connected to the transmission between the forward/reverse direction clutches and the range clutches; the motor is electrically powered by supercapacitors.

The configuration described in U.S. Pat. No. 8,353,804 B2 and as shown in FIG. 1 allows optimizing the efficiency of the hybrid transmission, since the electric motor power goes through one less conversion before reaching a transmission output (when compared to a pre-transmission parallel hybrid architecture). Further, the solution offers a torque multiplication factor of the range gears, which enables the use of a smaller motor in comparison to a post-transmission parallel hybrid architecture.

However, notwithstanding the above-described developments, there continues to exist a strong demand for long-lived, high-efficiency hybrid powertrains capable of providing high output torques.

SUMMARY OF THE INVENTION

Thus, the technical problem underlying the present invention consists of designing an alternative hybrid system with a power shifting transmission which is capable of providing high output torques, preferably over extended periods of time.

This problem is solved by a hydraulic hybrid powertrain for a vehicle according to claim 1. Special embodiments of the hydraulic hybrid powertrain are described in the dependent claims.

The presently proposed hydraulic hybrid powertrain for a vehicle comprises:
- an internal combustion engine (ICE) selectively drivingly engaged with an input of a stepped-ratio transmission, for example through at least one of a torque converter and through a speed direction changing device, an output shaft of the stepped-ratio transmission being selectively drivingly engaged with a vehicle output, for example through a clutching device;
- an intermediate gear set typically comprising one or more intermediate gears and/or one or more intermediate shafts, the intermediate gear set being drivingly engaged or selectively drivingly engaged with the ICE, for example through at least one of the speed direction changing device and the torque converter, and the intermediate gear set being drivingly engaged or selectively drivingly engaged with the input of the stepped-ratio transmission; and
- a hydraulic machine in fluid communication with a hydraulic accumulator assembly, a transmission shaft of the hydraulic machine being drivingly engaged or selectively drivingly engaged with the intermediate gear set for providing energy and/or torque to the intermediate gear set and for absorbing energy and/or torque from the intermediate gear set.

Within the scope of this document the formulation "at least one of $x_1, \ldots, x_n$" may include any subset of $x_1, \ldots, x_n$, including the complete set.

The hydraulic system comprising the hydraulic accumulator assembly as a secondary energy storage device and the hydraulic machine as a secondary motor is capable of providing high torques, as required in many off-highway applications, for example. Further, the hydraulic accumulator is capable of providing a constant or substantially constant high energy-density storage capacity over an extended period of time. The hydraulic machine can provide assistance to the ICE during acceleration, can recover energy under braking that would otherwise be lost as heat in a conventional braking operation; and can act as a load-leveling device by adding or subtracting torque at the ICE output, which allows optimal engine management.

The stepped-ratio transmission may provide several fixed gear ratios for engaging the ICE and/or the hydraulic machine with the vehicle output. For example, the stepped-ratio transmission may include one or more range gears and one or more range clutches. The range clutches may be adapted to selectively drivingly engage one or more of the range gears with one another, to selectively drivingly engage one or more of the range gears with the input of the stepped-ratio transmission and/or to selectively drivingly engage one or more of the range gears with the output shaft of the stepped-ratio transmission.

The torque converter may be of a known type. For example, the torque converter may comprise an impeller portion and a turbine portion and may be configured to provide fluid coupling between the impeller portion and the turbine portion. The torque converter may further comprise a stator interposed between the impeller portion and the turbine portion, the stator being adapted to alter the flow of fluid between the turbine portion and the impeller portion. The torque converter may be adapted to multiply torque. The impeller portion may be drivingly engaged or selectively drivingly engaged with an output shaft of the ICE. The turbine portion may be drivingly engaged or selectively drivingly engaged with the speed direction changing device. In order to minimize losses in the torque converter, a mechanical lock-up mechanism may be provided, the lock-up mechanism being adapted to selectively lock the impeller portion of the torque converter to the turbine portion of the torque converter.

The speed direction changing device may include one or more direction clutches, for example a forward direction clutch and a reverse direction clutch. For example, when the ICE is drivingly engaged with the vehicle output through the forward direction clutch, the vehicle is moving in the forward direction, and when the ICE is drivingly engaged with the vehicle output through the reverse direction clutch, the vehicle is moving in the reverse direction. The speed direction changing device may be adapted to selectively drivingly engage the torque converter, in particular the turbine portion of the torque converter, with the stepped-ratio transmission and with the intermediate gear set.

The vehicle output may include any ground-engaging structure. For example, the vehicle output may include at least one of a final drive, a drive shaft, one or more wheel-hub reduction gears, and one or more wheels.

The accumulator assembly may include one or more hydraulic accumulators. The accumulator assembly may be charged by increasing a quantity of hydraulic fluid in at least one of the hydraulic accumulators, thereby increasing a hydrostatic pressure in the respective hydraulic accumulator. Similarly, the accumulator assembly may be discharged by decreasing a quantity of hydraulic fluid in at least one of the hydraulic accumulators, thereby decreasing the hydrostatic pressure in the respective hydraulic accumulator. Typically, the hydraulic fluid is a liquid such as oil.

The one or more hydraulic accumulators may be configured as compressed gas accumulators. Compressed gas accumulators are generally known in the art. For example, a compressed gas accumulator may include a storage space comprising two chambers separated by an elastic diaphragm, by a piston or by a closed bladder. The first of the two chambers may contain a gas, such as an inert gas, and the second of the two chambers may be configured to be filled with a hydraulic fluid, respectively. A compressed gas accumulator may be charged by filling or by partially filling the second chamber with a hydraulic fluid, thereby compressing a quantity of gas contained in the first chamber. Similarly, a compressed gas accumulator may be discharged by letting a compressed gas contained in the first chamber expand, thereby pushing hydraulic fluid contained in the second chamber out of the second chamber and creating a fluid flow. The accumulator assembly may be adapted to operate at hydrostatic pressures up to a maximum operating pressure of at least 300 bar, of at least 400 bar, or of at least 450 bar.

The accumulator assembly may be in fluid communication with the hydraulic machine through at least one valve, including for example one or more directional valves and/or one or more shut-off valves, adapted to selectively fluidly separate the accumulator assembly or one or more of the accumulators of the accumulator assembly from the hydraulic machine.

The claims may further be directed to a vehicle including a powertrain of the presently proposed type. The vehicle may be an off-highway vehicle, for example. Off-highway vehicles may include but are not limited to tractors, harvesters, crawlers, mining vehicles or material handling vehicles such as wheel loaders, wheeled excavators, backhoe loaders, telehandlers, dumpers, or the like.

The hydraulic machine of the proposed powertrain, also termed secondary machine, may have at least one of the following properties:
a) a variable hydraulic displacement, wherein the hydraulic displacement may be defined as the volume of hydraulic fluid moved through the hydraulic machine per revolution of the transmission shaft of the hydraulic machine;
b) the ability to rotate in a clockwise direction and in a counter-clockwise direction (bidirectional hydraulic machine);
c) a positive and a negative hydraulic displacement setting for selectively changing, for a given direction of rotation of the transmission shaft of the hydraulic machine, a direction of flow of a hydraulic fluid flowing through the hydraulic machine.

The hydraulic machine may include a hydraulic pump for converting mechanical energy into hydraulic energy which may be stored in the accumulator assembly. The mechanical energy is typically transmitted to the hydraulic machine through the intermediate gear set and through the transmission shaft of the hydraulic machine in the form of rotational energy. Additionally or alternatively, the hydraulic machine may include a hydraulic motor for converting hydraulic energy stored in the accumulator assembly into mechanical energy which is typically provided at the transmission shaft of the hydraulic machine in the form of rotational energy. The transmission shaft of the hydraulic machine is also termed input shaft of the hydraulic machine.

A variable displacement hydraulic machine (see feature a)) allows controlling an amount of torque transmitted from the hydraulic machine to the intermediate gear set. For example, the hydraulic machine may include or may be configured as an axial piston pump/motor with a movable swashplate. Varying the displacement of the hydraulic machine may then be achieved by tilting the swashplate. Typically, the swashplate may be tilted with respect to a swivel axis which is arranged perpendicular to the axis of rotation of the piston pump/motor.

If the hydraulic machine features a variable displacement, the proposed powertrain may additionally comprise a displacement control device for controlling the displacement of the hydraulic machine, wherein controlling the displacement may include at least one of increasing the displacement, decreasing the displacement and keeping the displacement constant. For example, the displacement control device may comprise a hydraulic actuator, such as a hydraulic piston, and at least one electric valve for controlling a position of the hydraulic actuator. The electric valve may be configured as a directional valve, for example. The hydraulic actuator may be mechanically coupled to a moveable swashplate of the hydraulic machine for moving the swashplate. The displacement control device may be in fluid communication with a hydraulic circuit comprising the accumulator assembly and the hydraulic machine. For example, a hydraulic pressure in the hydraulic circuit may be used for controlling the position of the hydraulic actuator. This way, the displacement of the hydraulic machine may be varied using a minimum amount of electric energy.

Configuring the hydraulic machine as a bidirectional machine (see feature b)) allows drivingly engaging the hydraulic machine with the intermediate gear set irrespective of a direction of rotation of the intermediate gear set or of a direction of rotation of an intermediate shaft of the intermediate gear set. This typically implies that the hydraulic machine may be drivingly engaged with the intermediate gear set irrespective of a rotational direction of at least one of the vehicle output, the output shaft of the ICE, the torque converter, and the speed direction changing device. Configuring the hydraulic machine as a bidirectional machine in this way significantly increases the number of ways in which the hydraulic machine may be used in the powertrain, thereby rendering the powertrain more versatile and flexible.

The hydraulic machine having both a positive and a negative displacement setting (see feature c)) allows selectively charging and discharging the accumulator assembly for a given direction of rotation of the transmission shaft of the hydraulic machine (and typically for a given direction of rotation of at least one of the vehicle output, the output shaft of the ICE, the torque converter and the speed direction changing device). This may further increase the number of modes of operation of the hydraulic machine and the accumulator assembly. A non-limiting example of a hydraulic machine including feature c) is a hydraulic axial piston pump/motor with an over-center swashplate design. That is, from a neutral position in which the swashplate is arranged perpendicular to the axis of rotation of the piston pump/motor (corresponding to zero displacement) the swashplate may be tilted in both directions with respect to the above described swivel axis.

Hydraulic machines which may selectively function as a hydraulic pump and as a hydraulic motor and which feature the properties a), b) and c) are known as 4-quadrant machines, because they are adapted to operate in all four quadrants of the torque-speed-diagram. That is, a 4-quadrant machine is adapted to provide torque and to absorb torque during both forward and rearward movement of the vehicle.

If the hydraulic machine is configured as a unidirectional machine (i.e., if the hydraulic machine does not feature property b)), a disconnection device, for example a clutch, may additionally be provided between the hydraulic machine and the intermediate gear set. The disconnection device is then adapted to selectively disengage the hydraulic machine from the intermediate gear set, for example when a rotational direction of the hydraulic machine is not compatible with a rotational direction of the intermediate gear set. In this case, the hydraulic machine may only be used in a single direction, either forward or reverse.

Alternatively, if the hydraulic machine is configured as a unidirectional machine (i.e., if it does not feature property b)), the hydraulic machine may be drivingly engageable with the intermediate gear set through a mechanical shuttling device, the mechanical shuttling device being adapted to maintain a correct rotational direction on the transmission shaft of the hydraulic machine independently of a rotational direction of the intermediate gear set or independently of an intermediate shaft of the intermediate gear set. When combined in this manner, the unidirectional machine and the shuttling device provide the same functionality as a bidirectional machine.

The powertrain may comprise a fluid reservoir in fluid communication with the hydraulic machine. A hydrostatic pressure in the fluid reservoir may be at ambient pressure. Typically, the hydrostatic pressure in the fluid reservoir is lower than a hydrostatic pressure in the accumulator assembly. The hydraulic machine may be adapted to displace hydraulic fluid from the accumulator assembly to the fluid reservoir. For example, a pressure gradient between the accumulator assembly and the fluid reservoir may be used for displacing fluid from the accumulator assembly to the fluid reservoir through the hydraulic machine, thereby driving the hydraulic machine and providing an output torque at the transmission shaft of the hydraulic machine. Also, the hydraulic machine may be adapted to displace fluid from the fluid reservoir to the accumulator assembly for charging the accumulator assembly. For example, the hydraulic machine may absorb mechanical energy or torque from the intermediate gear set and use the absorbed energy/torque for pumping fluid from the fluid reservoir to the accumulator assembly.

Alternatively, the accumulator assembly may comprise at least one high-pressure accumulator in fluid communication with the hydraulic machine and at least one low-pressure accumulator in fluid communication with the hydraulic machine. The hydraulic machine may then be adapted to displace fluid from the high-pressure accumulator to the low-pressure accumulator and to displace hydraulic fluid from the low-pressure accumulator to the high-pressure accumulator. In this setup, the high-pressure accumulator, the low-pressure accumulator, and the hydraulic machine typically form a closed hydraulic circuit which is isolated from ambient pressure. The high-pressure accumulator may be adapted to operate at hydrostatic pressures up to a maximum hydrostatic pressure of at least 300 bar, of at least 400 bar or of at least 450 bar. Hydraulic energy stored in the accumulator assembly may be used to drive the hydraulic machine and to provide an output torque at the transmission shaft of the hydraulic machine by displacing fluid from the high-pressure accumulator to the low-pressure accumulator through the hydraulic machine. In reverse, the hydraulic machine may absorb mechanical energy or torque from the intermediate gear set and use the absorbed energy/torque for pumping fluid from the low-pressure accumulator to the high-pressure accumulator, thereby charging the accumulator assembly.

The high-pressure accumulator and the low-pressure accumulator may be fluidly connected to the hydraulic machine through at least one valve. The at least one valve may include one or more directional valves and/or one or more shut-off valves, for example. The valve may have at least three spool positions or configurations. When in the first spool position/configuration, the valve fluidly separates at least one of the high-pressure accumulator and the low-pressure accumulator from the hydraulic machine; when in the second spool position/configuration, the valve fluidly connects a first fluid port of the hydraulic machine to the high-pressure accumulator and fluidly connects a second fluid port of the hydraulic machine to the low-pressure accumulator; and when in the third spool position/configuration, the valve fluidly connects the first fluid port of the hydraulic machine to the low-pressure accumulator and fluidly connects the second fluid port of the hydraulic machine to the high-pressure accumulator. Fluidly connecting the high-pressure accumulator to a particular fluid port of the hydraulic machine usually implies fluidly disconnecting the high-pressure accumulator from the other fluid port. The same applies to the low-pressure accumulator.

One advantage of this setting is that, when connected to the high and low-pressure accumulators through the at least one valve as described above, even a single-displacement hydraulic machine (i.e, a hydraulic machine that does not feature property c), see above) may provide the same functionality as a hydraulic machine featuring both a positive and a negative displacement setting. For example, with the transmission shaft of the hydraulic machine turning in a given rotational direction, the accumulator assembly may be selectively charged or discharged by switching the valve to the appropriate spool position or configuration.

The powertrain may comprise a hydraulic working assembly including a hydraulic implement and a hydraulic working pump for driving the implement, a transmission shaft of the hydraulic working pump being drivingly engaged or selectively drivingly engaged with the output shaft of the ICE. The implement may include a hydraulic piston or any other type of mechanism adapted to convert hydraulic energy to mechanical energy. As a non-limiting example, the implement may be part of or include at least one of a lifting mechanism and a tipping mechanism. The hydraulic working pump may be a hydrostatic axial piston pump, for example.

The hydraulic working assembly may be in fluid communication with the accumulator assembly. For example, the working pump may be in fluid communication with the accumulator assembly for pressurizing/charging the accumulator assembly. The working pump may then be in fluid communication with a fluid reservoir and may be adapted to displace fluid from the fluid reservoir to the accumulator assembly for charging the accumulator assembly. This is a particularly efficient way of charging the accumulator assembly using the ICE, for example when the vehicle is not moving. Additionally or alternatively, the accumulator assembly may be in fluid communication with the implement for driving the hydraulic implement. This allows driving the implement when the ICE is turned off.

The working assembly may be fluidly connected to the accumulator assembly through at least one valve adapted to selectively fluidly separate the working assembly from the accumulator assembly or from one or more accumulators of the accumulator assembly. Said at least one valve may include one or more directional valves and/or one or more shut-off valves, for example. At least one of the hydraulic working pump and the hydraulic implement may be fluidly connected to the accumulator assembly through said valve.

The proposed powertrain may comprise a hydraulic pressure booster circuit in fluid communication with a fluid reservoir and in fluid communication with the hydraulic machine, the booster circuit being adapted to provide a pilot pressure to the hydraulic machine, in particular when the hydraulic machine is fluidly disconnected from the accumulator assembly. The booster circuit may comprise a hydraulic booster pump adapted to displace fluid from the fluid reservoir to the hydraulic machine for providing the pilot pressure. An input shaft of the booster pump may be drivingly engaged or selectively drivingly engaged with the output shaft of the ICE.

The booster circuit may be in fluid communication with the hydraulic working assembly. In other words, the hydraulic working assembly may be in fluid communication with the hydraulic machine through the booster circuit. In this setup, the working pump of the hydraulic working assembly may be configured to function as the booster pump.

Typically, the hydraulic working assembly may be operated at hydrostatic pressures up to a maximum operating pressure of at most 250 bar or of at most 300 bar. That is, the maximum operating pressure of the hydraulic working assembly may be lower or even significantly lower than the maximum operating pressure in the hydraulic circuit that comprises the accumulator assembly and the hydraulic machine. Therefore, if the hydraulic working assembly and the hydraulic circuit comprising the accumulator assembly and the hydraulic machine are in fluid communication, a safety mechanism may be provided between the hydraulic working assembly and said hydraulic circuit, the safety mechanism being adapted to protect the working assembly from a potentially damaging hydrostatic pressure in the hydraulic circuit comprising the accumulator assembly and the hydraulic machine. The safety mechanism may be part of the above-described booster circuit. The safety mechanism may include at least one check valve adapted to allow a fluid flow from the working assembly to the hydraulic circuit comprising the accumulator assembly and the hydraulic machine, and to block a fluid flow from said hydraulic circuit to the working assembly, for example.

The proposed powertrain may further comprise a mechanical splitter box, the splitter box being adapted to at least one of: selectively drivingly engage the output shaft of the ICE with the transmission shaft of the hydraulic working pump; selectively drivingly engage the output shaft of the ICE with the intermediate gear set, for example through at least one of the torque converter and the speed direction changing device (for example, the splitter box may be drivingly engaged or selectively drivingly engaged with the impeller portion of the torque converter); and selectively drivingly engage the intermediate gear set with the transmission shaft of the hydraulic working pump, for example through at least one of the torque converter and the speed direction changing device.

Such a splitter box significantly increases the number of operational modes of the powertrain. For example, the splitter box allows drivingly engaging the hydraulic machine with the hydraulic working pump while disengaging the ICE from the hydraulic machine and the hydraulic working pump. This way, the hydraulic working pump may be driven through the hydraulic machine.

The present application further relates to a number of methods of operating the presently proposed hydraulic hybrid powertrain. These methods are described in detail further below. In order to carry out these methods, the powertrain may additionally include a control unit or electronic control unit (ECU) which is adapted to carry out the method steps by controlling the components of the powertrain used for carrying out the respective method steps. For example, the control unit may be adapted to control at least one of: the ICE, the splitter box, the at least one (directional) valve for selectively fluidly connecting the hydraulic working assembly to the hydraulic accumulator assembly, the torque converter, the lock-up mechanism of the torque converter, the speed direction changing device, the stepped-ratio transmission, the clutching device for selectively drivingly connecting the stepped-ratio transmission with the vehicle output, the disconnection device and the shuttling device between the hydraulic machine and the intermediate gear set, the electric valve and/or the hydraulic actuator for controlling the displacement of the hydraulic machine, the at least one (directional) valve for selectively fluidly connecting the accumulator assembly or one or more accumulators of the accumulator assembly to the hydraulic machine. Typically, the control unit is adapted to control the aforementioned components through electric signals. The control unit may be operated by an operator through one or more input devices. The input devices may include one or more knobs, switches, levers, keys, or touchscreens, for example.

In the following, the aforementioned methods of operating the presently proposed hydraulic hybrid powertrain are described.

The present application relates to a method of regenerative braking of a vehicle including the presently proposed hydraulic hybrid powertrain. The method comprises the following steps:

drivingly engaging the hydraulic machine with the vehicle output and fluidly connecting the hydraulic machine to the hydraulic accumulator assembly;

driving the hydraulic machine by transmitting kinetic energy from the vehicle output to the hydraulic machine, thereby braking the vehicle output; and at least partially converting the braking energy into hydraulic energy using the hydraulic machine and storing the hydraulic energy in the hydraulic accumulator assembly.

Preferably, the method further includes the step of drivingly disengaging the hydraulic machine and the stepped-ratio transmission from the ICE, for example by unlocking the speed direction changing device, so that no braking energy is absorbed by the ICE and a maximum amount of braking energy may be stored in the accumulator assembly. If the hydraulic machine has a positive and a negative displacement setting, regenerative braking can be performed during movement of the vehicle in a forward and in a reverse direction by properly adjusting the displacement of the hydraulic machine.

The present application further relates to a method of charging the accumulator assembly of the presently proposed hydraulic hybrid powertrain. The method comprises the following steps:

disengaging the vehicle output, drivingly engaging the ICE with the hydraulic machine, for example through the lock-up mechanism of the torque converter and the speed direction changing device, and fluidly connecting the hydraulic machine to the accumulator assembly; and transmitting torque from the internal combustion engine to the hydraulic machine and using the torque transmitted from the internal combustion engine to the hydraulic machine to charge the hydraulic accumulator assembly.

This method allows charging the accumulator assembly when the vehicle is not moving. Furthermore, this method allows charging/pressurizing the accumulator assembly up to the maximum operating pressure of the accumulator assembly. Disengaging the vehicle output usually includes disengaging the disconnection device or clutch between the stepped-ratio transmission and the vehicle output.

The present application further relates to another method of charging the hydraulic accumulator assembly of the presently proposed hydraulic hybrid powertrain, wherein the hydraulic hybrid powertrain includes a hydraulic working pump, the hydraulic working pump being selectively drivingly engaged with the ICE and the hydraulic working pump being selectively fluidly connected to the hydraulic accumulator assembly. The method comprises the following steps:

drivingly engaging the ICE with the hydraulic working pump and fluidly connecting the hydraulic working pump to the hydraulic accumulator assembly; and transmitting torque from the internal combustion engine to the working pump and using the torque transmitted from the internal combustion engine to the working pump to charge the hydraulic accumulator assembly.

Typically, this method allows charging/pressurizing the accumulator assembly only up to the maximum operating pressure of the working assembly, which is usually lower than the maximum operating pressure of the accumulator assembly. The method may be performed while the vehicle is moving.

The method may also include the step of disengaging the ICE from at least one of the vehicle output and the hydraulic machine, for example by disengaging the speed direction changing device. The method then allows charging the accumulator assembly when the vehicle is not moving. Charging/pressurizing the accumulator assembly through the ICE and the working pump may be more efficient than charging the accumulator assembly through the ICE and the hydraulic machine as in the method described above. For example, compared to the mechanical coupling between the ICE and the working pump, the mechanical coupling between the ICE and the hydraulic machine may be more prone to losses or may include heavier mechanical parts that consume more energy when driven or turned.

The present application further relates to a method of starting the internal combustion engine of the presently proposed hydraulic hybrid powertrain, wherein the method comprises the following steps:

disengaging the vehicle output, drivingly engaging the hydraulic machine with the ICE, and fluidly connecting the hydraulic accumulator assembly to the hydraulic machine; and driving the hydraulic machine using hydraulic energy stored in the hydraulic accumulator assembly and transmitting torque from the hydraulic machine to the ICE for starting the ICE.

The method allows starting the ICE without electric power. Disengaging the hydraulic machine from the vehicle output may include disengaging the stepped-ratio transmission from the vehicle output. The hydraulic machine may be drivingly engaged with the ICE through at least one of the lock-up mechanism of the torque converter and the speed direction changing device.

The present application further relates to a method of driving the hydraulic implement of the presently proposed hydraulic hybrid powertrain, the method comprising the steps of:

if a hydrostatic pressure in the hydraulic accumulator assembly is below a threshold pressure:
fluidly connecting the hydraulic accumulator assembly to the hydraulic implement; and
driving the hydraulic implement using hydraulic energy stored in the hydraulic accumulator assembly; or, if the hydrostatic pressure in the hydraulic accumulator assembly is above the threshold pressure:
drivingly engaging the hydraulic machine with the hydraulic working pump through lock-up mechanism of the torque converter and through the splitter box, and fluidly connecting the hydraulic accumulator assembly to the hydraulic machine; and
driving the hydraulic implement through the hydraulic machine and the hydraulic working pump using hydraulic energy stored in the hydraulic accumulator assembly.

Usually, the threshold pressure is the maximum operating pressure of the hydraulic working assembly, typically between 200 bar and 300 bar. In other words, when the hydrostatic pressure in the accumulator assembly is so high that it may possibly damage the hydraulic working assembly, the implement is driven through the hydraulic machine and the working pump. It is furthermore conceivable to drivingly engage the hydraulic machine with both the working pump and with the vehicle output and to use hydrostatic energy stored in the hydraulic accumulator assembly to drive the vehicle output and the working pump at the same time.

Only when the hydrostatic pressure in the accumulator assembly is below the threshold pressure the implement may be driven by the accumulator assembly directly. To this end, a direct fluid connection is established between the accumulator assembly and the implement.

BRIEF DESCRIPTION OF THE DRAWINGS

The above, as well as other advantages of the present invention, will become readily apparent to those skilled in the art from the following detailed description when considered in the light of the accompanying drawing in which:

FIGS. 7A-C show a further embodiment of a hydraulic hybrid powertrain including a hydraulic working assembly and a pressure booster pump for providing a pilot pressure to a hydraulic machine;

FIGS. 8A-B show time sequences of actuations and variables during a start operation of the hydraulic hybrid powertrain of FIGS. 7A-C;

FIGS. 11A-C show a further embodiment of a hydraulic hybrid powertrain;

FIG. 14 shows a further embodiment of a hydraulic hybrid powertrain, the powertrain including a 4-quadrant hydraulic machine and a single hydraulic accumulator in fluid communication with the hydraulic machine and with a hydraulic working assembly; and FIG. 15 shows a further embodiment of a hydraulic hybrid powertrain, the powertrain including a hydraulic machine and a hydraulic accumulator assembly comprising a high-pressure accumulator and a low-pressure accumulator, the accumulator being in fluid communication with the hydraulic machine and with a hydraulic working assembly.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined herein. Hence, specific dimensions, directions or other physical characteristics relating to the embodiments disclosed are not to be considered as limiting, unless expressly stated otherwise.

In the off-highway market, hydraulic hybridization is typically preferred to electrical hybridization for its higher power density and for the higher maturity of hydraulic technology in the off-highway market, as it is already present in heavy-duty off-highway vehicles.

Figure 1:
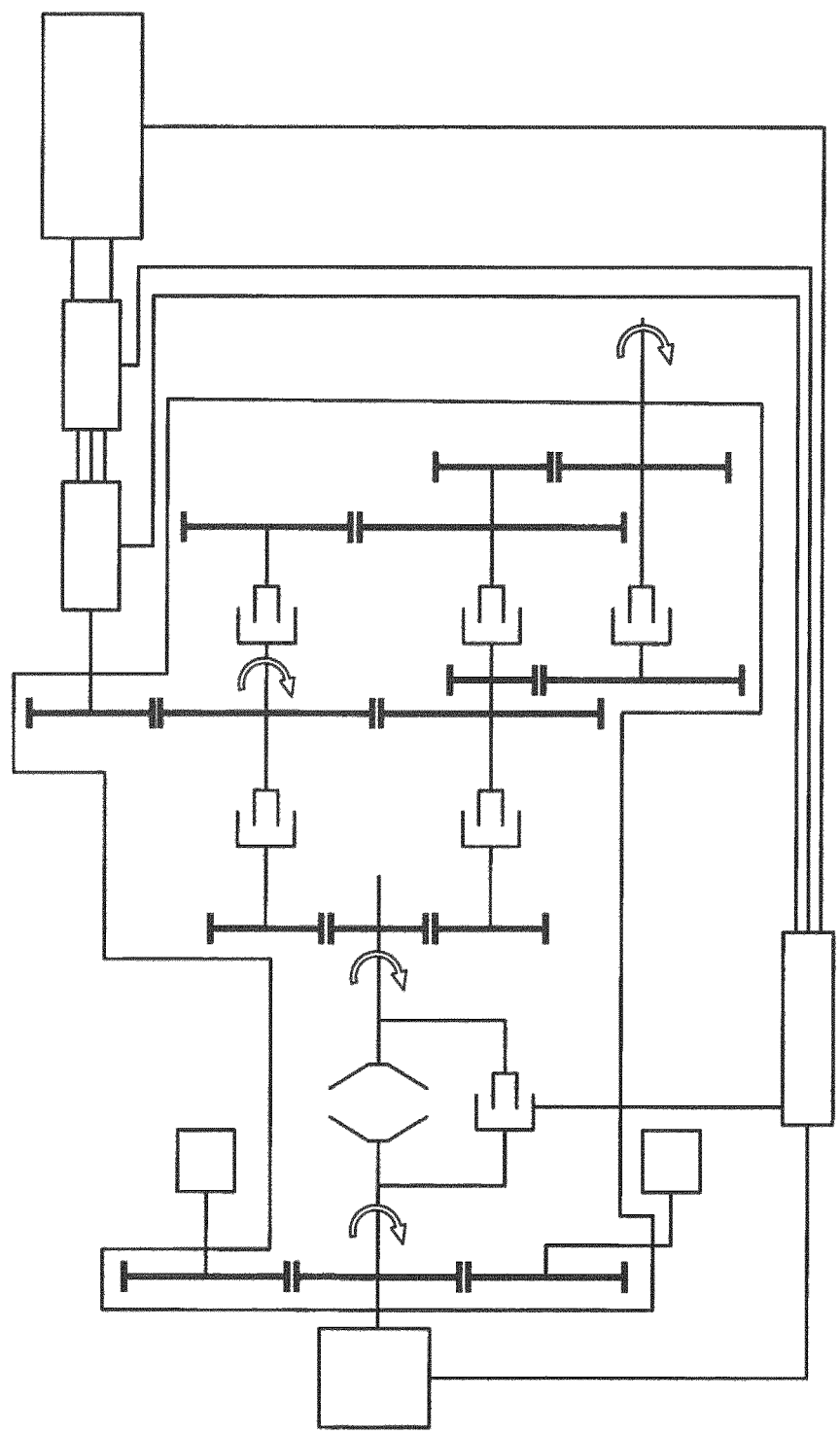
FIG. 1 shows an electric hybrid powertrain known from the prior art.
Figure 2:
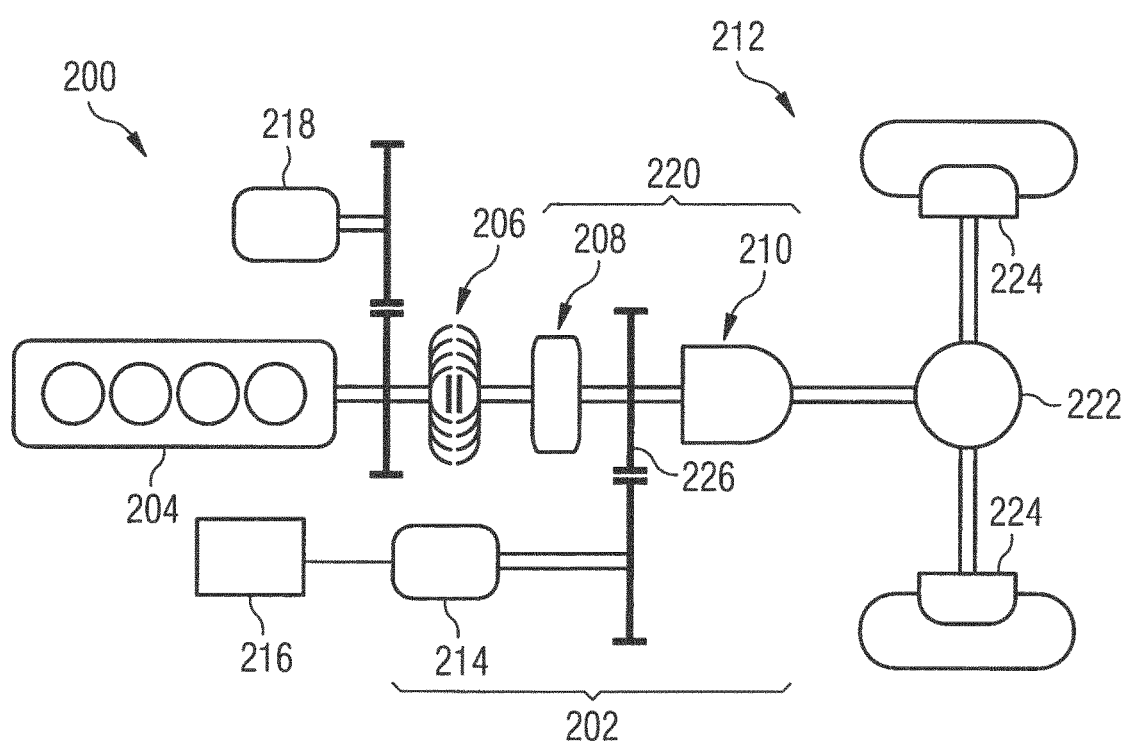
FIG. 2 shows an embodiment of a hydraulic hybrid powertrain.

The invention described in this document overcomes the limitation associated with most known parallel hybrid implementations and provides a suitable solution for use of a parallel hybrid architecture including hydraulic technology, as applied to an off-highway vehicle. The solution proposed, which is illustrated in FIG. 2, is a powertrain 200 including a parallel hydraulic hybrid transmission 202. The powertrain 200 is composed of an ICE 204, a torque converter 206, a speed direction changing device 208, a stepped-ratio transmission 210, a vehicle output 212, a hydraulic machine 214, and at least one hydraulic accumulator 216.

The ICE 204 drives an auxiliary device 218, such as a hydraulic pump. The auxiliary device 218 typically powers implements associated with the powertrain 200. The torque converter 206 provides a fluid-dynamic connection between the ICE 204 and a transmission 220. The transmission 220 is comprised of the speed direction changing device 208 and the stepped-ratio transmission 210. The speed direction changing device 208 facilitates changing a drive direction of the powertrain 200 using a forward clutch (not shown) and a reverse clutch (not shown). The stepped-ratio transmission 210 provides several fixed gear ratios which the power train 200 may be operated in. The vehicle output 212 includes a final drive 222 and a set of wheel-hub reduction gears 224; however, it is understood that the vehicle output 212 may be any ground engaging structure. The hydraulic machine 214 is a hydraulic pump/motor which is in driving engagement with an intermediate gear set 226 of the transmission 220. The hydraulic accumulator 216 is in fluid communication with the hydraulic machine 214.

The torque converter 206 is drivingly engaged with the ICE 204 and the speed direction changing device 208 of the transmission 220. The speed direction changing device 208 is also drivingly engaged with the intermediate gear set 226. The hydraulic machine 214 is also drivingly engaged with the intermediate gear set 226 for providing energy to or absorbing energy from the intermediate gear set 226.

Figure 3:
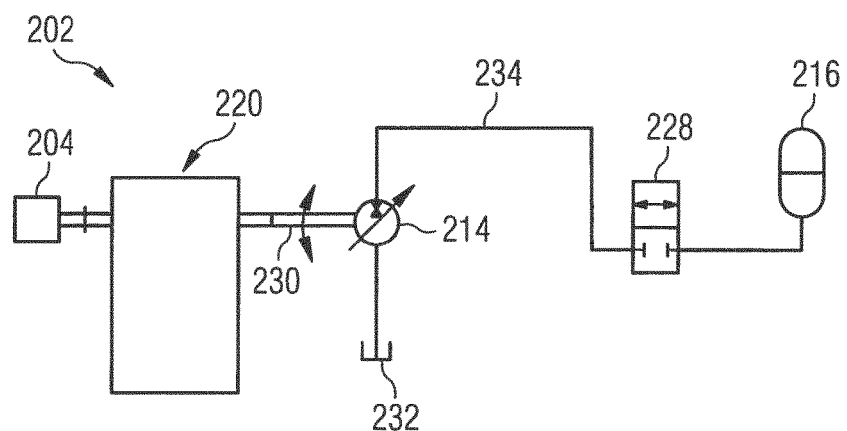
FIG. 3 shows a further embodiment of a hydraulic hybrid powertrain including a 4-quadrant hydraulic machine.

FIG. 3 illustrates a detailed implementation of the parallel hydraulic hybrid transmission 202. Here and in all of the following, recurring features are designated with the same reference signs. FIG. 3 illustrates the hydraulic machine, 214 a shut-off valve 228, and the hydraulic accumulator 216.

The hydraulic machine 214 is characterized by the following properties:
a) having a variable displacement, in order to regulate an amount of torque applied to an intermediate shaft 230;
b) ability to rotate in both clockwise and counter-clockwise directions, since the intermediate shaft 230 may be rotated in two different directions, depending on an engagement position of the speed direction changing device 208;
c) a positive and a negative displacement setting (the hydraulic machine 214 is an over-center swashplate design), in order to change the flow direction for a given speed direction, thus allowing to select whether to charge or discharge the hydraulic accumulator 216;
d) ability to function as either a hydraulic pump or a hydraulic motor.

With reference to FIG. 2, the hydraulic machine 214 is drivingly engaged with the intermediate gear set 226, for example, through the intermediate shaft 230.

An inlet of the hydraulic machine 214 is in fluid communication with a reservoir 232 while an outlet of the hydraulic machine 214, through a hydraulic line 234, is in fluid communication with the shut-off valve 228. The shut-off valve 228 has two ports and two spool positions. A remaining port of the shut-off valve 228 is in fluid communication with the hydraulic accumulator 216, which is a high pressure hydraulic accumulator.

When the shut-off valve 228 is in a neutral position (as shown in FIG. 3), the hydraulic accumulator 216 is isolated from the hydraulic line 234 and the hydraulic machine 214 must be at a zero displacement position. When the shut-off valve 228 is in the other position instead, the hydraulic line 234 is in fluid communication with the hydraulic accumulator 216 and is at a pressure of the hydraulic accumulator 216.

Depending on a sign of the displacement and of a speed of the intermediate shaft 230, the hydraulic machine 214 can work as a hydraulic motor or as a hydraulic pump. When performing as a hydraulic motor, the hydraulic machine 214 displaces fluid from the hydraulic accumulator 216 to the reservoir 232, adding torque to the intermediate shaft 230. When performing as a hydraulic pump, the hydraulic machine 214 subtracts torque from the transmission 220 while pumping fluid from the reservoir 232 to the hydraulic accumulator 216, thus raising the pressure in the hydraulic accumulator 216. As a non-limiting example, the hydraulic machine 214 may act as a hydraulic pump during regenerative braking.

A displacement setting on the hydraulic machine 214 determines a value of the torque and a flow of fluid through the hydraulic machine 214.

The detailed implementation of the parallel hydraulic hybrid transmission 202 shown in FIG. 3 is able to work in both a forward and a reverse vehicle direction, and can add or subtract torque from the power train 200 in either direction.

Figure 4:
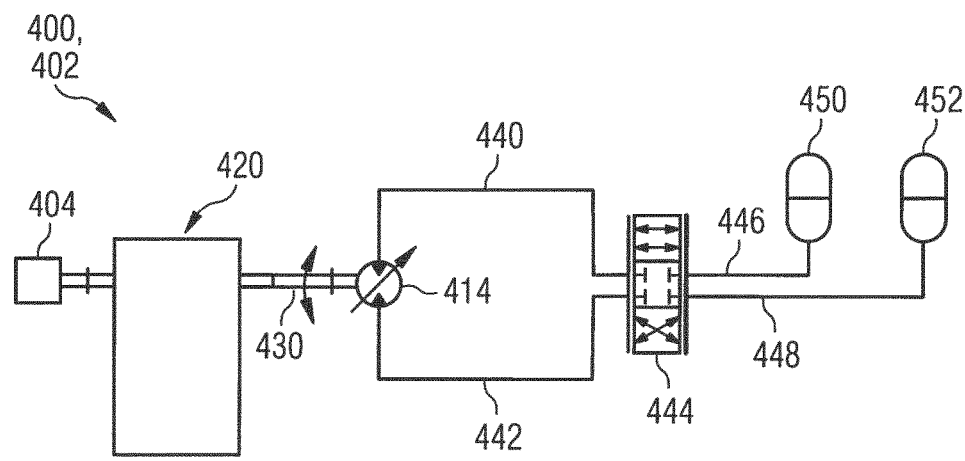
FIG. 4 shows a further embodiment of a hydraulic hybrid powertrain including a high-pressure hydraulic accumulator and a low-pressure hydraulic accumulator.
Figure 5:
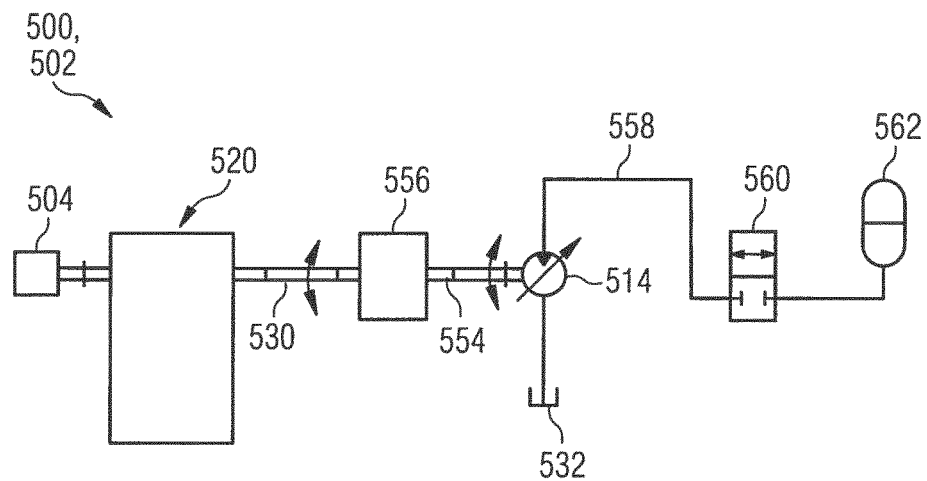
FIG. 5 shows a further embodiment of a hydraulic hybrid powertrain wherein a hydraulic machine is coupled to a transmission through a shuttling device.
Figure 6:
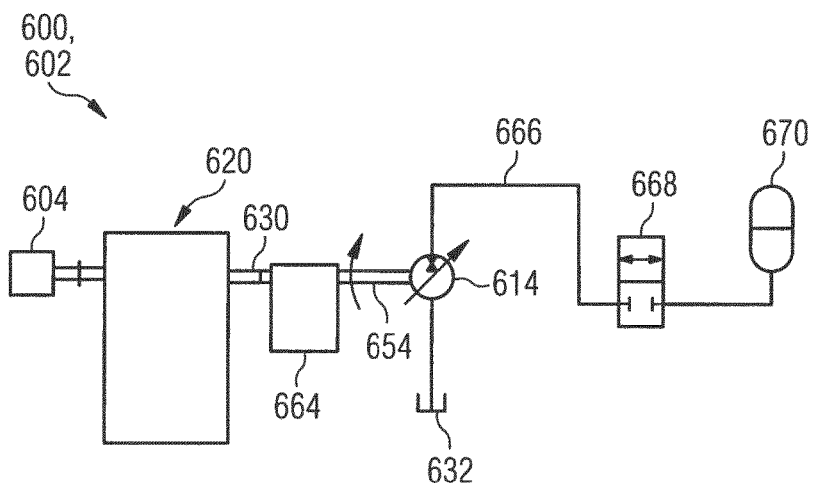
FIG. 6 shows a further embodiment of a hydraulic hybrid powertrain wherein a hydraulic machine is coupled to a transmission through a disconnection device.

A hydraulic machines, such as the hydraulic machine 214, having each of the four properties described hereinabove, indicated respectively at a), b), c), and d), are known as 4-quadrant machines, because of their ability to operate in all four quadrants of a torque/speed diagram. 4-quadrant machines are commercially available, but are not very common and typically increase cost of a powertrain the 4-quadrant machine is incorporated in. FIGS. 4-6 illustrate alternate embodiments of the parallel hydraulic hybrid transmission 202 shown in FIGS. 2 and 3. The embodiments shown in FIGS. 4-6 make use of hydraulic machines with reduced properties.

FIG. 4 illustrates a detailed implementation of a parallel hydraulic hybrid transmission 402 of a powertrain 400 (partially illustrated) according to another embodiment of the invention. The embodiment shown in FIG. 4 includes similar components to the parallel hydraulic hybrid transmission 202 illustrated in FIGS. 2 and 3. Similar features of the embodiment shown in FIG. 4 are numbered similarly in series, with the exception of the features described below.

The powertrain 400 includes a hydraulic machine 414 which only has the properties a), b) and d) as described hereinabove. The hydraulic machine 414 is a typical closed-circuit axial piston motor having a variable displacement. A displacement of the hydraulic machine 414 is only variable in a positive range. The hydraulic machine 414 is drivingly engaged with an intermediate shaft 430, which is in driving engagement with a transmission 420. A first hydraulic line 440 and a second hydraulic line 442 afford fluid communication between the hydraulic machine 414 and a directional valve 444. The directional valve 444 has four ports and three spool positions, and the movement of the spool controls a fluid flow through the directional valve 444. On an opposing side of the directional valve 444, a third hydraulic line 446 and a fourth hydraulic line 448 afford fluid communication between a high-pressure accumulator 450 and a low-pressure accumulator 452.

Depending on a position the directional valve 444 is placed in, the directional valve 444 one of separates the accumulators 450, 452 from the hydraulic lines 440, 442, fluidly connects the high-pressure accumulator 450 with the first hydraulic line 440 and the low-pressure accumulator 452 with the second hydraulic line 442, or fluidly connects the high-pressure accumulator 450 with the second hydraulic line 442 and the low-pressure accumulator 452 with the first hydraulic line 440. When the directional valve 444 is in a neutral position, the accumulators 450, 452 are isolated from the hydraulic lines 440, 442, and the hydraulic machine 414 must be at substantially zero displacement. When the directional valve 444 is in one of the other two positions, the displacement of the hydraulic machine 414 and the amount of pressure difference between the hydraulic lines 440,442 determines a value of the torque delivered, while a sign is determined by the position of the directional valve 444, which connects one of the hydraulic lines 440, 442 to the high-pressure accumulator 450, and a remaining one of the lines 440, 442 to the low-pressure accumulator 452. A sign of the pressure difference between the lines 440, 442 determines a sign of the torque delivered by the hydraulic machine 414.

While the powertrain 400 is operated in a forward direction, torque boosting is obtained by fluidly connecting the first hydraulic line 440 with the high-pressure accumulator 450 and the second hydraulic line 442 with the low-pressure accumulator 452, which generates a positive output torque. A negative torque, for example, used for regenerative braking, is obtained by connecting the second hydraulic line 442 with the high-pressure accumulator 450 and the first hydraulic line 440 with the low-pressure accumulator 452.

FIG. 5 illustrates a detailed implementation of a parallel hydraulic hybrid transmission 502 of a powertrain 500 (partially illustrated) according to another embodiment of the invention. The embodiment shown in FIG. 5 includes similar components to the parallel hydraulic hybrid transmission 202 illustrated in FIGS. 2 and 3. Similar features of the embodiment shown in FIG. 5 are numbered similarly in series, with the exception of the features described below.

The powertrain 500 includes a hydraulic machine 514, which is a hydraulic pump with a variable positive/negative displacement and a single direction of rotation. Such features are common of a standard over-center pump. The hydraulic machine 514 only has the properties a), c) and d) as described hereinabove. Consequently, between an input shaft 554 of the hydraulic machine 514 and an intermediate shaft 530 drivingly engaged with a transmission 520, a mechanical shuttling device 556 is provided. The mechanical shuttling device 556 is able to maintain a correct rotational direction on the input shaft 554 independently of a direction of rotation of the intermediate shaft 530.

An inlet of the hydraulic machine 514 is in fluid communication with a reservoir 532 while an outlet, through a hydraulic line 558, is in fluid communication with a shutoff valve 560.

The shut-off valve 560 has two ports, two spool directions and controls a flow between the hydraulic line 558 and a high-pressure accumulator 562. When the shut-off valve 560 is in a neutral position, the high-pressure accumulator 562 is isolated from the hydraulic line 558, and the hydraulic machine 514 must have substantially zero displacement. In a remaining position, the hydraulic line 558 is in fluid communication with the high-pressure accumulator 562, and the hydraulic line 558 is under a high pressure.

A displacement of the hydraulic machine 514 and a pressure on the hydraulic line 558 determines a value of a torque, and a sign of the displacement determines a direction of the torque and a flow. According to a direction of rotation of the intermediate shaft 530, a positive displacement determines either a positive torque or a negative torque, therefore control of the hydraulic machine and the mechanical shuttling device 556 must be adapted to a speed and direction of the powertrain 500.

FIG. 6 illustrates a detailed implementation of a parallel hydraulic hybrid transmission 602 of a powertrain 600 (partially illustrated) according to another embodiment of the invention. The embodiment shown in FIG. 6 includes similar components to the parallel hydraulic hybrid transmission 202 illustrated in FIGS. 2 and 3. Similar features of the embodiment shown in FIG. 6 are numbered similarly in series, with the exception of the features described below.

The powertrain 600 includes a hydraulic machine 614, which is a hydraulic pump with a variable positive/negative displacement and a single direction of rotation. Such features are common of a standard over-center pump. The hydraulic machine 614 only has the properties a), c) and d) as described hereinabove. Consequently, between an input shaft 654 of the hydraulic machine 614 and an intermediate shaft 630 drivingly engaged with a transmission 620, a disconnection device 664 is provided.

The disconnection device 664 between the hydraulic machine 614 and the intermediate shaft 630 of the transmission 620 allows the input shaft 654 of the hydraulic machine 614 to be drivingly disengaged from the intermediate shaft 630 of the transmission 620.

An inlet of the hydraulic machine 614 is in fluid communication with a reservoir 632 while an outlet, through a hydraulic line 666, is in fluid communication with a shut-off valve 668.

The shut-off valve 668 has two ports, two spool directions and controls a flow between the hydraulic line 666 and a high-pressure accumulator 670. When the shut-off valve 668 is in a neutral position, the high-pressure accumulator 670 is isolated from the hydraulic line 666, and the hydraulic machine 614 must have substantially zero displacement. In a remaining position, the hydraulic line 666 is in fluid communication with the high-pressure accumulator 670, and the hydraulic line 666 is under a high pressure. A value of a torque produced by the hydraulic machine 614 is determined by a displacement of the hydraulic machine 614 and a pressure in the hydraulic line 666, and a sign of the displacement (positive or negative) determines whether the hydraulic machine 614 works as a hydraulic pump or a hydraulic motor.

The disconnection device 664 allows the hydraulic machine 614 to be drivingly disengaged from the transmission 620 when a rotation of the intermediate shaft 630, and thus a drive direction of the powertrain 600, is not compatible with a rotational direction of the hydraulic machine 614. Accordingly, the parallel hydraulic hybrid transmission 602 is only active in a single direction, either forward or reverse.

A portion of a life of a working machine comprises being placed in an idling condition, where the working machine is stopped while an engine of the working machine is running at a minimum speed. Further, the working machine does not have any request from the operator. In the idling condition, an ICE of the working machine could be shut off in order to reduce a fuel consumption of the working machine. To restart the ICE, an electric motor, commonly referred to as a starter, may be used to accelerate the ICE up to a minimum rate that enables a fuel injection and firing process. Usually, vehicles with an automatic start and stop functionality (which is normally based on recognition of missing input from operator and an idling of the ICE for a certain time) are equipped with an oversized electric starter and a main battery, due to an increased request of engine starts during an overall life of the vehicle.

The presently proposed powertrain further relates to a specific arrangement, built over a parallel hybrid configuration, which is capable of performing a start and stop operation on the ICE 204 using a hybrid machine instead of an electric starter. The arrangement according to FIGS. 7A-C, 11A-C and 13 is detailed for use with a hybrid machine that is hydraulic and a storage device associated with the hybrid machine is a hydro pneumatic accumulator. The same system architecture may also be applied to an electric hybrid solution.

As shown in FIG. 7A, a powertrain 1200 comprises: an ICE 204, which powers an auxiliary device 218 (e.g., a hydraulic pump), such as for operating implements; a torque converter 206, which provides a fluid-dynamic connection between the ICE 204 and a transmission; a speed direction changing device 208 including pair of direction clutches, for enabling a forward and a reverse drive mode; a stepped-ratio transmission 210, which provides several speed ratios and a disconnection of the drive, which is an important feature for the proposed concept, as disconnection allows the vehicle to be stopped even while the hydraulic machine 214 is driven; a final drive reduction gear 222 and a wheel-hub reduction gear 224 (see FIG. 2, not shown in FIG. 7A); a hydraulic machine 214, which is drivingly engaged with an intermediate gear set 226; a boost pump BP, a shut-off valve 228 selectively fluidly connecting the hydraulic machine 214 with the hydraulic accumulator 216, and a splitter box 260 adapted to selectively drivingly engage the ICE 204 with at least one of the hydraulic pump 218 and the torque converter 206. The splitter box 260 may furthermore be adapted to drivingly engaged the hydraulic pump 218 with the torque converter 206 while disengaging the hydraulic pump 218 and the torque converter 206 from the ICE 204.

The torque converter 206 is drivingly engaged with the ICE 204 and the pair of direction clutches 208. The direction clutches 208 are also drivingly engaged with the intermediate gear set 226. The hydraulic machine 214 is also drivingly engaged with the intermediate gear set 226 to provide energy to it or absorb energy from the intermediate gear set 226.

The hydraulic machine 214 is characterized by the following properties:
a) having a variable displacement, in order to regulate the amount of torque applied to an intermediate shaft;
b) an ability to rotate in both clockwise and counterclockwise directions, since the intermediate shaft rotates in two different directions depending on an engagement status of one of the direction clutches;
c) a positive and a negative displacement setting (an over-center swashplate design, for instance), in order to change a flow direction for a given speed direction, thus allowing to select whether to charge or discharge the hydraulic accumulator 216; and
d) an ability to operate as either a hydraulic pump or a hydraulic motor.

A displacement of the hydraulic machine 214 is controlled by an electric valve 215. The electric valve 215 has four ports and three spool positions; however, it is understood that similar functionality may be provided by a combination of valves. As the hydraulic machine 214 is normally closed, the boost pump BP, which is mounted on a shaft of a working hydraulic assembly WH, is required to pressurize hydraulic lines 240, 241 between the boost pump BP and the hydraulic machine 214 and guarantee a piloting of the hydraulic machine 214. The hydraulic machine 214 is drivingly engaged with the intermediate gear set 226 through the use of the transmission shaft 230, for example.

An inlet of the hydraulic machine 214 is in fluid communication with the reservoir 232, while an outlet, through the hydraulic line 241, is in fluid communication with the shut-off valve 228. The shut-off valve 228 has two ports and two spool positions. A remaining port of the shut-off valve 228 is in fluid communication with the high-pressure accumulator 216.

When the shut-off valve 228 is placed in a neutral position (as shown in FIG. 7A), the high-pressure accumulator 216 is isolated from the hydraulic line 241 and the hydraulic machine 214 must be set at substantially zero displacement. In a remaining position, the hydraulic line 241 is in fluid communication with the high-pressure accumulator 216, and the hydraulic line 241 is at a pressure of the high-pressure accumulator 216, which is typically a high pressure. Depending on a sign of the pump displacement and of the shaft speed, the hydraulic machine 214 can work as a hydraulic motor or as a hydraulic pump.

When the hydraulic machine 214 is operated as a hydraulic motor, the hydraulic machine 214 displaces fluid from the high-pressure accumulator 216 to the reservoir 232, while applying torque to the transmission shaft 230. When the hydraulic machine 214 is operated as a hydraulic pump, it absorbs torque from the transmission 210 while pumping hydraulic fluid from the reservoir 232 to the high-pressure accumulator 216 (for example, during regenerative braking), thus raising a pressure within the high-pressure accumulator 216. A displacement setting on the hydraulic machine 214 determines a value of the torque and flow of the hydraulic fluid. The hydraulic machine 214 is able to be operated in both the forward direction and the reverse direction, and can add or subtract torque in either direction.

At the end of a braking maneuver the high-pressure accumulator 216 is in a charged condition, for example, being pressurized to about 200 bar. If an operator is not providing any command to the hydraulic hybrid powertrain 1200 in such a condition, the ICE 204 can be shut down. A plurality of strategies to define when to stop and restart the ICE 204 are described in detail hereinbelow.

Based on specific control settings, the ICE 204 can be automatically shut down in two ways: by sending to an engine control unit (ECU) a specific command that inhibits the fuel injection; or by modifying an electronic circuit between the ECU and the internal combustion engine, in order to control an electronic command to the fuel injectors and inhibit or enable the fuel injectors on request.

As shown in FIG. 7A, the following conditions are defined:
  the ICE 204 is not running and the hydraulic machine 214 automatically swivels back to zero displacement, as there is no pressure on the hydraulic lines; and
  the high-pressure accumulator 216 is charged (for example, to about 200 bar). In such a condition, the hydraulic machine 214 cannot be commanded to swivel out in any direction, as there is no pressure in the hydraulic lines.

Through a lock-up (not shown), which physically links an impeller portion 206a to a turbine portion 206b of the torque converter 206, the torque converter 206 is effectively changed into a mechanical coupling, to avoid slippage and large power losses. By activating the lock-up of the torque converter 206, disconnecting the transmission 210 by means of a gearbox clutch (not shown), and connecting the high-pressure accumulator 216 to the hydraulic machine 214, the hydraulic hybrid powertrain 1200 may be operated in a manner as shown in FIG. 7B.

Figure 7B:
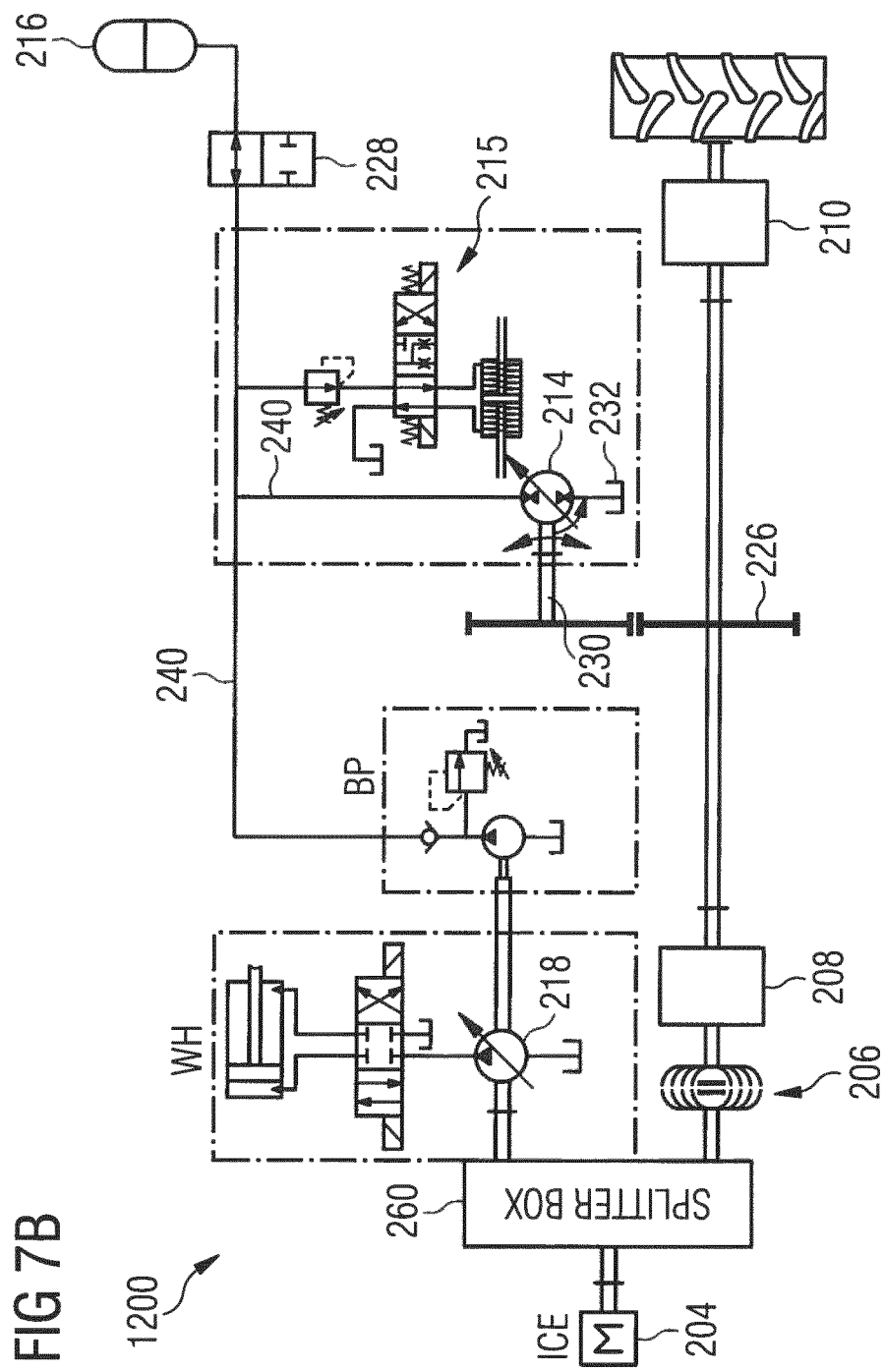

In the condition of the hydraulic hybrid powertrain 1200 as shown in FIG. 7B, the hydraulic machine 214 has pressure on the hydraulic lines 241 so that it may be swiveled out. The hydraulic machine 214 is actuated to direct flow from the high-pressure accumulator 216 to the reservoir 232, so that the transmission shaft 230 rotates in a direction similar to the ICE 204, which is dependent on a configuration of the ICE 204, the transmission shaft 230 thereby driving the ICE 204. To prevent damage from occurring to the ICE 204, it is understood that a best hydraulic machine/pump opening percentage is dependent on several factors, which are discussed hereinbelow.

Once the ICE has reached an idling speed, the hydraulic hybrid powertrain 1200 can be piloted as show in FIG. 7C. As shown in FIG. 7C, the electric valve 215 is actuated to command the hydraulic machine 214 to swivel back to substantially zero displacement.

Once the hydraulic machine 214 reached its neutral position, the high-pressure accumulator 216 can be fluidly disconnected without any risk of cavitation, as the pilot pressure is now provided by the boost pump BP, the electric valve 215 is left in its neutral position, and the torque converter lock-up and the gearbox clutch are actuated to restore a normal driving configuration.

FIGS. 8A and 8B summarize the main actuations and variables which are present during a start operation of the hydraulic hybrid powertrain 1200 according to FIGS. 7A-C. The plots shown in FIG. 8A are the actuations:
  c_GB: a clutch on the output shaft of the gearbox 210;
  LU: a lock-up of the torque converter 206;
  HMV: a position of the hydraulic machines valve 215 that controls the hydraulic machine 214 displacement; and
  HV: the shut-off valve used to isolate the high pressure accumulator 216 from the hydraulic line 240.

The plots shown in FIG. 8B are the main system variables:
  pL: a pressure of the hydraulic line 240;
  pHP: a pressure of the high-pressure accumulator 216;
  pBP: a pressure of the boost pump BP;
  $\alpha$: a displacement of the hydraulic machine 214; and
  ICE: a rotational speed of the ICE.

According to the explanations provided hereinabove, the key points of the above trends can be defined as follows:

When t<t1, the ICE 204 is not running and the high-pressure accumulator 216 is charged at its maximum pressure of about 200 bar.

When t=t1, the starting procedure is initiated. The gearbox clutch is opened to disengage the transmission 210 from the wheels, and the torque converter lock-up is locked to optimize transmission from the hydraulic machine 214 to the ICE 204. Simultaneously, the electric valve 215 is controlled to command the hydraulic machine 214 to swivel in a given direction, and the high-pressure accumulator 216 is connected to the hydraulic line 240 by commanding the shut-off valve 228. A pressure pL of the hydraulic line 240 has the same value as the pressure pHP of the high-pressure accumulator 216.

In the period from t1 to t2, the hydraulic machine 214 is swiveling ($\alpha$ is increasing) and, since it is subject to a pressure, it starts rotating: the pressure from the high-pressure accumulator 216 and the line pressure are decreasing, since the hydraulic machine 214 is facilitating a transfer of fluid to the reservoir 232. As a consequence, the ICE 204 is dragged through the kinematic chain, the boosting pump BP also rotates and the pressure pBP increases.

t2 is the time at which the ICE 204 reached an idling condition, and the hydraulic machine 214 is commanded to swivel back to substantially zero displacement (and the electric valve 215 is placed in a closed position). In this condition, the pressures of the hydraulic line 240 and the high-pressure accumulator 216 reach an intermediate value p* (in the range (p_min+p_max)/2) depending on an overall acceleration performance of the ICE 204. The boosting pump BP instead generates a nominal pressure (for example, about 30 bar) to guarantee a piloting of the secondary machine 214.

In the period from t2 to t3, the hydraulic machine 214 is swiveling back. The ICE 204 is in the idling condition, but the high-pressure accumulator 216 cannot be fluidly disconnected until the displacement α is substantially equal to zero to avoid cavitation. Accordingly, in this period the hydraulic machine 214 is still allowing fluid to transfer to the reservoir 232, and the pressures pL and pHP are decreasing at a slower rate.

At t=t3, the ICE 204 is running and the hydraulic machine 214 is at substantially zero displacement. The starting procedure is thus finished and the high-pressure accumulator 216 can be fluidly disconnected from the hydraulic line 240 (and the shut-off valve 228 is placed in a closed position), and the gearbox clutch and the torque converter lock-up can be actuated to restore the normal driving condition for the hydraulic hybrid powertrain 1200.

It is important to mention that an optimized machine/pump swiveling angle depends on several factors. A trend should be to maximize an angle to maximize the torque, but it depends also on a state of charge of the high-pressure accumulator 216 according to the following equation: $T=\alpha \cdot pHP$.

Furthermore, the timings depend on some factors, like the dynamics of the direction clutches 218, a state of charge of one or more accumulators, an inertia and a resistance of the ICE 204, an efficiency of the hydraulic machine 214, and additional factors.

Hereinabove it was described how to stop the ICE 204 and restart the ICE 204 by using energy stored in the high-pressure accumulator 216. Next, a rationale used to define how and when the ICE 204 can be stopped and restarted will be discussed.

The ICE 204 can be stopped when the following two conditions are met:

1. Operator inputs—A stop of the ICE 204 depends on an input from a plurality of operator inputs, such as but not limited to a steering wheel, one or more pedals, joysticks, levers, or buttons. A time based logic is suitable for determining, based on the operator input, if a stop is appropriate. For example, if the ICE 204 is in the idling condition and there have been no commands from the operator for a given amount of time, the ICE 204 may be stopped.

2. A state of charge of one or more accumulators—A second rationale which is considered refers to a state of charge of one or more accumulators. It has been mentioned that at the end of a hybrid braking process a high-pressure accumulator is charged while a low-pressure accumulator is at a minimum pressure, which is typically just above a pre-charge pressure. However, this may not always be the case, since it depends on an amount of energy available at a beginning of the braking maneuver (which may be effected by a kinetic energy of the vehicle and an amount of energy already stored in the accumulators). As a consequence, the ICE 204 can be stopped only if there is enough energy stored in the accumulators 216 to restart the ICE 204. Further, if the condition regarding the operator inputs is satisfied but the state of charge of the accumulators 216 is too low, by means of the hydraulic hub arrangement it is possible to exploit the ICE 204 and the hydraulic machine 214 to automatically store energy in the accumulators 216. Following such a step, the condition regarding a state of charge of the accumulators 216 is satisfied and the ICE 204 can be shut down.

Figure 9:
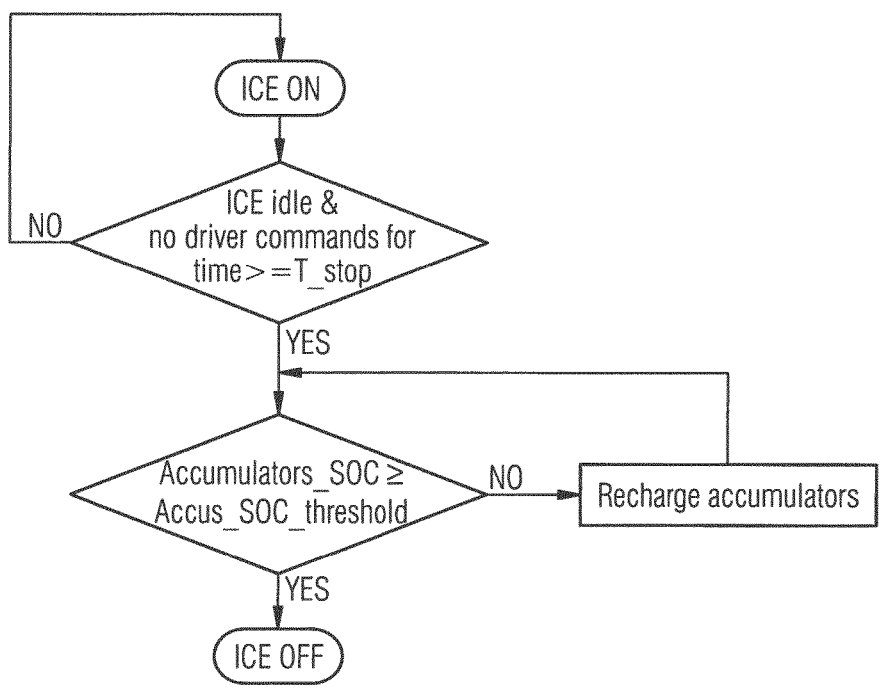
FIG. 9 shows steps of a procedure of shutting down an internal combustion engine of the powertrain of FIGS. 7A-C.

The above-discussed rationale regarding a shut down procedure of the ICE 204 is schematically illustrated in FIG. 9. Once the ICE 204 is off, all unnecessary electric loads are excluded to minimize a discharge from an electric battery, such as from unused sensors, actuations, and the like.

Figure 10:
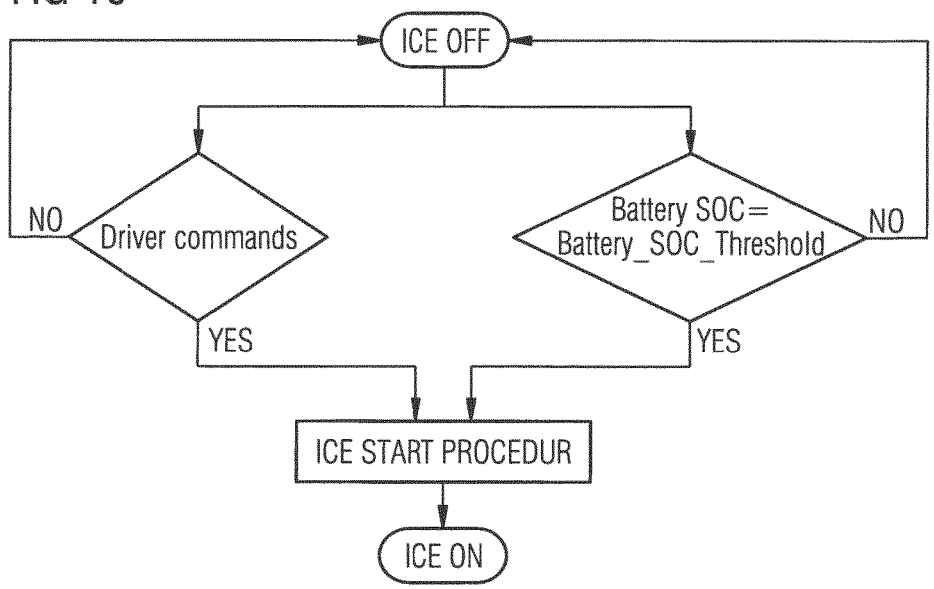
FIG. 10 shows steps of a procedure of starting the internal combustion engine of the powertrain of FIGS. 7A-C.

A restart procedure is schematically illustrated in FIG. 10. The restart procedure is performed if one of the two following conditions occurs:

1. Operator inputs—If the operator gives any input to the system, the procedure must be executed to restart the ICE 204.

2. A state of charge of the battery—If, for any reason, such as through the operation of lights, sensors, or the like, the state of charge of the electric battery gets close to a minimum threshold to guarantee all the actuations needed for the restart procedure, the restart procedure will be performed to place the ICE 204 in an operating condition.

The start and stop procedure discussed hereinabove can be applied also to different hydraulic hybrid architectures, with proper modifications to the control strategy.

Figure 11A:
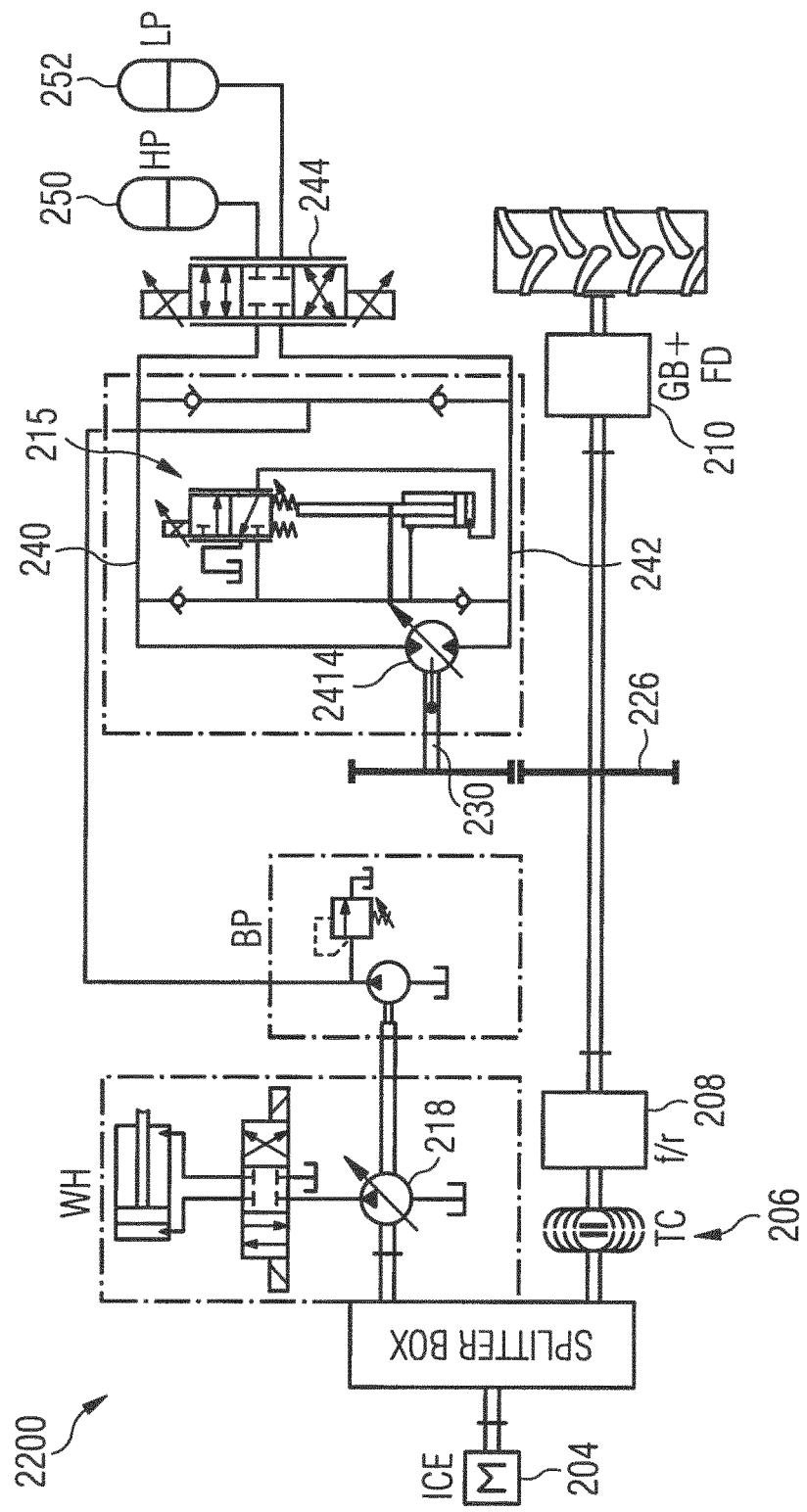

As shown in FIG. 11A, a hydraulic hybrid powertrain 2200, which is a variant of the powertrain 1200 described above, is based on a hydraulic machine 2414 which only has the properties a), b) and d) which are described hereinabove. The hydraulic machine 2414 may be a typical closed-circuit axial piston motor with variable displacement. A lack of property c) is due to the displacement varying only in one (positive) range. The displacement of the hydraulic machine 2414 depends on the position of an on/off valve 215. When the on/off valve 215 is in a neutral position, a displacement of the hydraulic machine 2414 is substantially equal to zero. The hydraulic machine 2414 is directly connected to a shaft 230 of the transmission. A plurality of hydraulic lines 240, 242 fluidly connects the hydraulic machine 2414 to a high-pressure accumulator 250 and a low-pressure accumulator 252, through a directional valve 244.

Depending on a position, the directional valve 244 can separate the accumulators 250, 252 from the hydraulic lines 240, 242, connect the high-pressure accumulator 250 with the line 240 and the low-pressure accumulator 252 with the line 242, or vice versa. When the directional valve is in the neutral position (as shown in FIG. 11A) the accumulators 250, 252 are isolated from the hydraulic lines 240, 242 and the hydraulic machine 2414 must be at substantially zero displacement.

A boost pump BP, mounted on a shaft of a working hydraulic assembly WH, is required to lubricate the hydraulic machine 2414 and guarantee a minimum pressure in the hydraulic lines 240, 242 to pilot the hydraulic machine 2414. A clutch is present on a gearbox 210 to disconnect the wheels.

At the end of a braking maneuver, the high-pressure accumulator 250 is charged (to about 200 bar), while the low-pressure accumulator 252 is at a minimum pressure (of about 20 bar), as show in FIG. 11A. If an operator is not providing any command, the ICE 204 can be shut down. Strategies to define when to stop and re-start the ICE 204 were described hereinabove.

With regards to FIG. 11A, the following conditions are defined:
- the ICE 204 is not running and the hydraulic machine 2414 automatically swivels back to zero displacement (no pressure on the hydraulic lines 240, 242);
- the high-pressure accumulator 250 is charged (to about 200 bar); and
- the low-pressure accumulator 252 is charged (to about 20 bar).

Figure 11B:
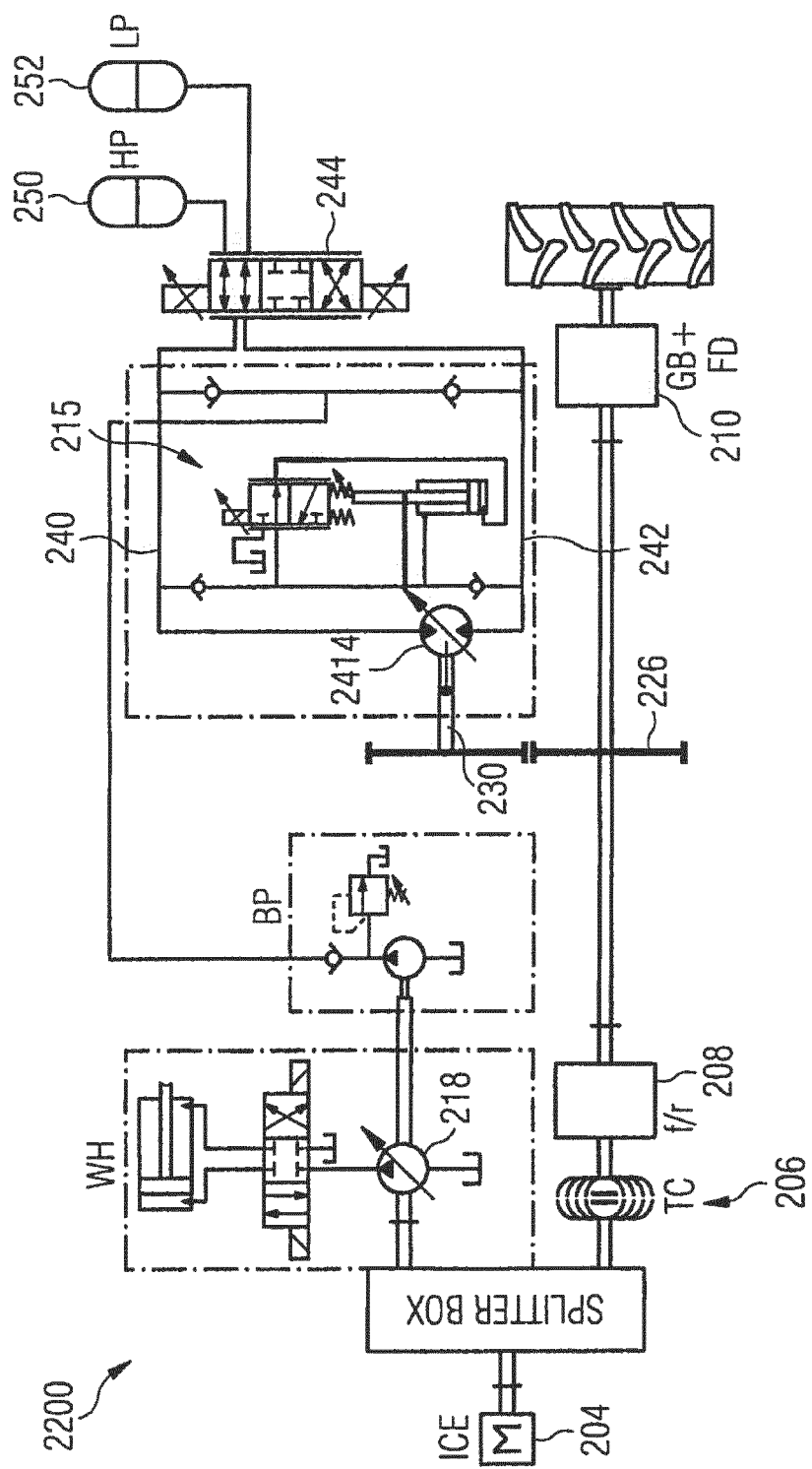

In such a condition the hydraulic machine 2414 cannot be commanded to swivel out in any direction, as there is no pressure in the hydraulic lines 240, 242. By activating a torque converter lock-up, opening the clutch of the gearbox 210, and connecting the accumulators 250, 252 to the hydraulic machine 2414, the powertrain 2200 is arranged as shown in FIG. 11B.

In such a condition the hydraulic machine 2414 is subject to a difference of pressure, and is actuated to direct flow from the high-pressure accumulator 250 to the low-pressure accumulator 252 so that the shaft 230 rotates in an appropriate direction, which is dependent on an arrangement of the ICE 204. However, it is understood that the combination of accumulators 250, 252 and their respective connections to the lines 240, 242 and a direction of the hydraulic machine 2414 swiveling is dependent on a position of the directional valve 244. It is possible to drive the shaft 230 in one direction (for example, clockwise) by connecting the high-pressure accumulator 250 to a first line and swivel the hydraulic machine 2414 in forward or vice versa. On the other hand, a wrong relation between the connection of the accumulators 250, 252 and swivel direction results in a wrong shaft (and ICE) direction of rotation, which may result in engine damage.

Once the ICE 204 has reached an idling speed, the system can be piloted as show in FIG. 11C. The on/off valve 215 is actuated to command the hydraulic machine 2414 to swivel back to substantially zero displacement, and the pilot pressure is now provided by the boost pump BP.

Once the hydraulic machine 2414 reaches a neutral position, the accumulators 250, 252 can be fluidly disconnected without any risk of cavitation, the directional valve 244 is commanded to a neutral position, and the torque converter lock-up and gearbox clutch are commanded to restore a driving condition.

Figure 12B:
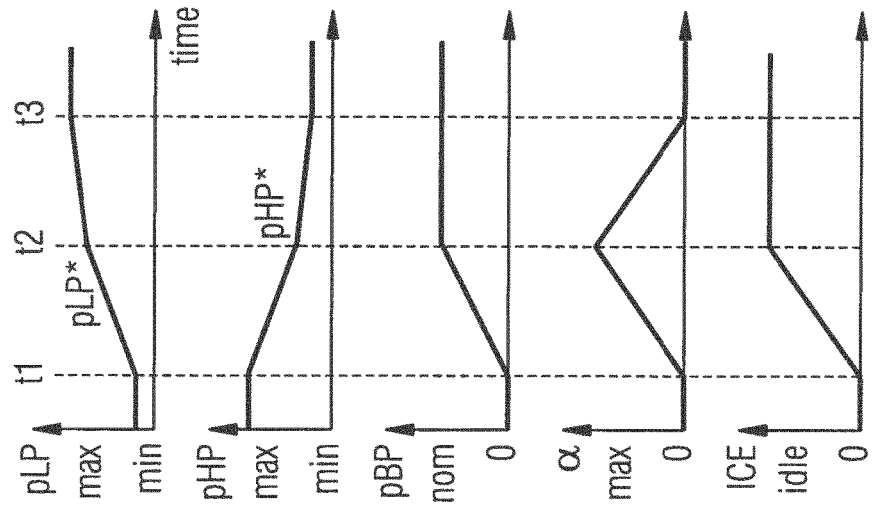
FIGS. 12A-B show time sequences of actuations and variables during a start operation of the hydraulic hybrid powertrain of FIGS. 11A-C.
Figure 12A:
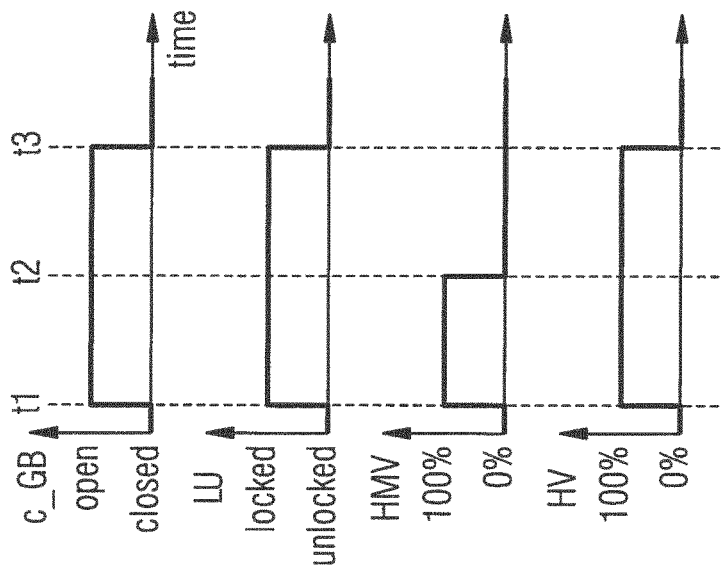

FIGS. 12A and 12B summarizes the main actuations and variables during the start operation of hydraulic hybrid powertrain 2200 according to FIGS. 11A-C. The plots shown in FIGS. 12A and 12B illustrate the actuations and system variables as defined with regard to FIGS. 8A and 8B above, respectively.

In the same way defined for the other embodiment described hereinabove, the key points of the trends for the first variant of the invention are summarized as follows:

At t<t1 the ICE 204 is not running, the high-pressure accumulator 250 is charged at its maximum pressure (of about 200 bar) and the low-pressure accumulator 252 is at a minimum pressure (of about 20 bar).

At t=t1 the starting procedure is initiated: the clutch of the gearbox 210 is opened to drivingly disengage the transmission from the wheels, and the torque converter lock-up is engaged to optimize transmission from the hydraulic machine 2414 to the ICE 204. At the same time, the on/off valve 215 is controlled to command the hydraulic machine 2414 to swivel in a given direction and the accumulators 250, 252 are fluidly connected to the hydraulic lines 240, 242 by commanding the directional valve 244 (as for the other embodiment described hereinabove, the pressure of a hydraulic line is identical to that of the connected accumulator—the trends are thus not represented).

In the period from t1 from t2, the hydraulic machine 2414 is swiveling ($\alpha$ is increasing) and, since it is subject to a pressure, it starts rotating: pHP is decreasing and pLP is increasing, since the hydraulic machine 2414 facilitates transfer of fluid from the high-pressure accumulator 250 to the low-pressure accumulator 252. As a consequence, force is applied to the ICE 204, the boosting pump BP rotates as well and, thus, the pressure pBP increases.

At t2 the ICE 204 reaches an idling condition, and the hydraulic machine 2414 is commanded to swivel back to substantially zero displacement (the on/off valve 215 is closed). In such a condition, a pressure of the accumulators 250, 252 reaches the intermediate values pLP* and pHP*, which depend on an overall ICE 204 acceleration performance. The boosting pump BP instead generates a nominal pressure (of about 30 bar) to guarantee a piloting of the hydraulic machine 2414.

In the period from t2 to t3, the hydraulic machine 2414 is swiveling back: the ICE 204 is in an idling condition, but the accumulators 250, 252 cannot be fluidly disconnected until $\alpha=0$ in order to avoid cavitation. Accordingly, in this period the hydraulic machine 2414 is still transferring fluid from the high-pressure accumulator 250 to the low-pressure accumulator 252.

At t=t3, the ICE 204 is running and the pump is at zero displacement. The starting procedure is thus finished: the accumulators 250, 252 can be disconnected from the hydraulic lines 240, 242 (the directional valve 244 is closed), the clutch for the gearbox 210 and the torque converter lock-up can be actuated to restore the normal driving condition.

Figure 13:
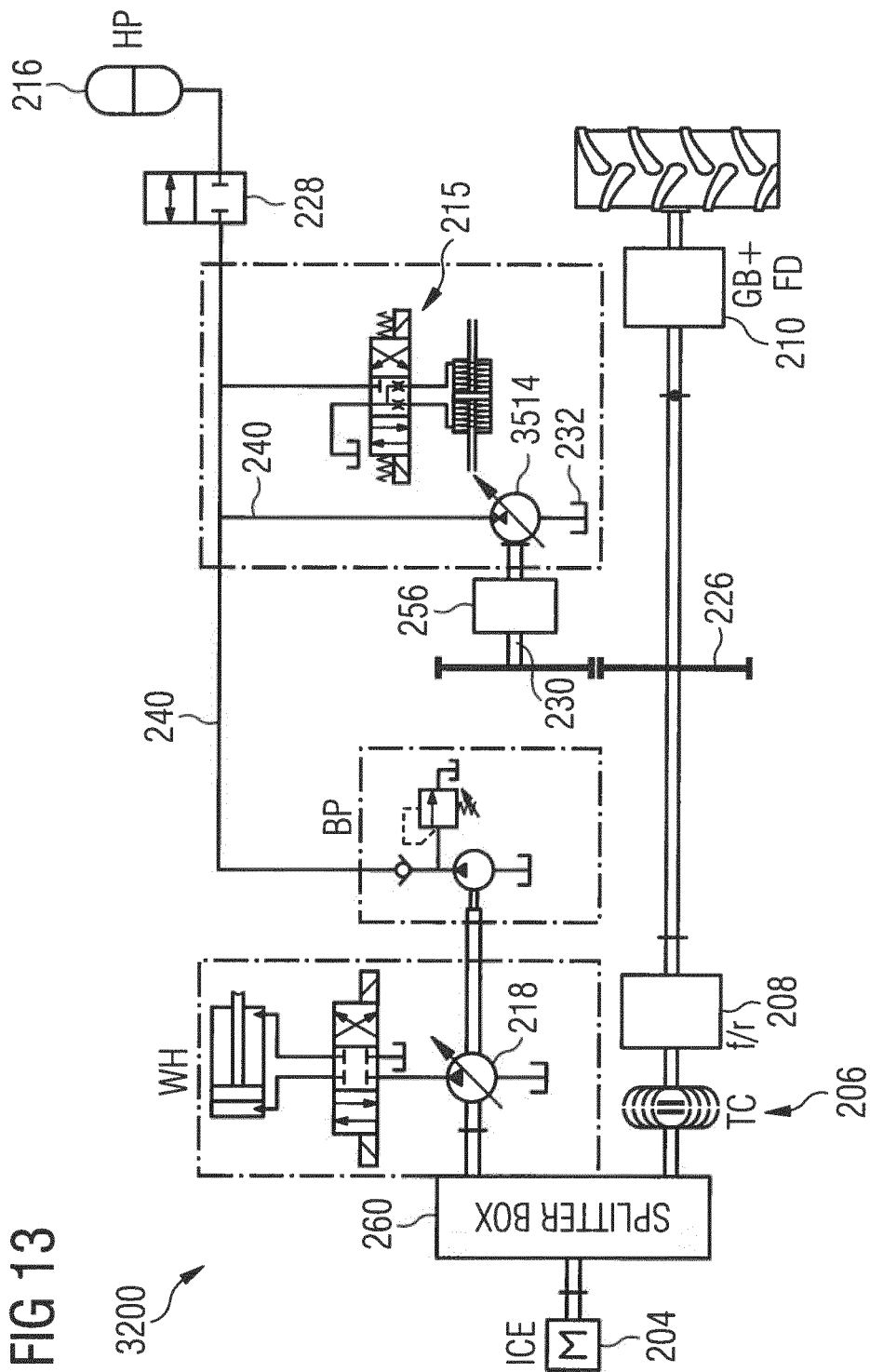
FIG. 13 shows a variant of the hydraulic hybrid powertrain of FIGS. 11A-C.

A further hydraulic hybrid powertrain 3200, another variant of the powertrain 1200 described above, is shown in FIG. 13. As shown in FIG. 13, a hydraulic machine 3514 with a variable positive/negative displacement and one direction of rotation is selected (a standard over-center open-circuit pump). This means that property b), which was described hereinabove, is missing. Due to this, a mechanical shuttling device 256 is present between the shaft of the hydraulic machine 3514 and the shaft 230 of the transmission. The mechanical shuttling device 256 is able to maintain a correct rotational direction on the hydraulic pump shaft independently of a direction of rotation of the intermediate shaft 230.

The inlet of the hydraulic machine 3514 is fluidly connected to a reservoir 232 while an outlet, through a hydraulic line 240, is fluidly connected with a shut-off valve 228. The shut-off valve 228 has two ports, two spool directions, and controls a flow between the hydraulic line 240 and the high-pressure accumulator 216. When the shut-off valve 228 is in the neutral position, the high-pressure accumulator 216 is isolated from the hydraulic line 240, and the hydraulic machine 3514 must be at substantially zero displacement. In a remaining position of the shut-off valve 228, the line 240 is at a high pressure. In the variant shown In FIG. 13, a boosting pump BP is needed. The boosting pump BP is used to pressurize the hydraulic line 240 and guarantee a piloting pressure even when the hydraulic machine 3514 is at zero displacement.

A displacement of the hydraulic machine 3514 determines a value of the torque, and the sign of the displacement determines a direction of the torque and flow. According to the direction of rotation of the shaft of the hydraulic machine 3514, a positive displacement may determine either a positive or a negative torque, and therefore a control must be adapted to a direction of the vehicle.

Further, a combination of the hydraulic machine 3514 according to FIG. 13 and the shuttling device 256 is equal to having a 4-quadrant machine like the one embodiment described hereinabove. As a consequence, the ICE 204 start procedure and modes of operations detailed for the preferred embodiment can be easily extended to variant shown in FIG. 13, with the only difference that the shuttling device 256 must be properly commanded.

A third variant (not shown) of the hydraulic hybrid powertrain is identical to the hydraulic hybrid powertrain variant shown in FIG. 13, with the exception that the shuttling device 256 is replaced by a disconnection device adapted to drivingly disconnect the hydraulic machine 3514 from the intermediate gear set 226. Accordingly, this third variant allows the hybrid operations in only one direction of motion of the vehicle.

The disconnection device according to the third variant allows the hydraulic machine 3514 to be disengaged from the transmission when a direction of the vehicle (for example, a rotational direction of the shaft 230) is not compatible with a rotational direction of the hydraulic machine 3514. Therefore, the hydraulic hybrid powertrain is only active in one direction, either a forward direction or a reverse direction. Further, the ICE 204 starting procedure is identical to the one discussed hereinabove, with the additional constraint related to the management of the disconnection device.

FIG. 14 illustrates a further hydraulic hybrid powertrain 4200. The powertrain 4200 comprises an internal combustion engine (ICE) 204, which is selectively drivingly engaged with an input of a stepped-ratio transmission 210 through a mechanical splitter box 260, a torque converter 206, and a speed direction changing device 208. An output of the stepped-ratio transmission 210 is selectively drivingly engaged with a vehicle output 212 through a disconnection device or clutch 211. The vehicle output 212 may include at least one of a final drive, a set of wheel-hub reduction gears, and one or more wheels. The speed direction changing device 208 includes a forward and a reverse direction clutch. The torque converter 206 provides fluid dynamic coupling between the ICE 204 and the speed direction changing device 208. The torque converter 206 comprises an impeller portion 206a, a turbine portion 206b, and a stator for varying a fluid flow between the impeller portion 206a and the turbine portion 206b. The torque converter 206 further includes a lock-up mechanism (not shown) for selectively locking the impeller portion 206a to the turbine portion 206b. The stepped-ratio transmission 210 provides a number of fixed gear ratios between its input and its output.

The powertrain 4200 further includes an intermediate gear set 226. The intermediate gear set 226 is selectively drivingly engaged with the ICE 204 through the speed direction changing device 208, the torque converter 206, and the splitter box 260. The intermediate gear set 226 is furthermore drivingly engaged with the input of the stepped-ratio transmission 210. The intermediate gear set 226 is interposed between the speed direction changing device 208 and the stepped-ratio transmission 210.

The powertrain 4200 further includes a hydraulic system comprising a hydraulic machine 214 and a high-pressure hydraulic accumulator 216. The hydraulic machine 214 is drivingly engaged with the intermediate gear set 226 through a transmission shaft 230. The high-pressure accumulator 216 and the hydraulic machine 214 are in fluid communication through a shut-off valve 228a, a directional valve 228b and a fluid line 240. The accumulator 216 is furthermore in fluid communication with a hydraulic working assembly 236 (described below) through the valves 228a, 228b and a fluid line 241. The valves 228a, 228b are arranged in series. The shut-off valve 228a has two fluid ports and two spool positions. The valve 228b has three fluid ports and two spool positions. When the shut-off valve 228a is in the first spool position, the accumulator 216 may be selectively fluidly connected to the hydraulic machine 214 or to a hydraulic working assembly 236 (see below) through the valve 228b. When the valve 228a is in the second spool position, it fluidly disconnects or isolates the accumulator 216 from the hydraulic machine 214 and from the working assembly 236.

It is understood that the valves 228a, 228b depicted here could likewise be replaced by a single 3-way 3-position valve (also termed 3/3 way valve), as will be readily apparent to a skilled person. For example, in a first spool position such a 3/3 way valve fluidly separates the accumulator 216 from the working assembly 236 and from the hydraulic machine 214; in a second spool position the 3/3 way valve fluidly connects the accumulator 216 to the working assembly 236 and fluidly separates the accumulator 216 from the hydraulic machine 214; and in a third spool position the 3/3 way valve fluidly connects the accumulator 216 to the hydraulic machine 214 and fluidly separates the accumulator 216 from the hydraulic working assembly 236.

The hydraulic machine 214 has the following properties:
a) a variable hydraulic displacement for regulating an amount of torque applied to the intermediate shaft 230;
b) the ability to rotate in a clockwise direction and in a counter-clockwise direction;
c) a positive and a negative displacement setting for changing a flow direction of a hydraulic fluid flowing through the hydraulic machine 214 for a given rotational direction of the transmission shaft 230; and
d) the ability to operate as either a hydraulic pump or as a hydraulic motor.

In the present example, the hydraulic machine 214 is configured as a hydrostatic axial piston unit with a moveable swashplate, the swashplate having an over-center swashplate design. The hydraulic machine 214 is furthermore in fluid communication with a fluid reservoir 232. When working as a hydraulic pump, the hydraulic machine 214 may absorb energy from the intermediate gear set 226 and use the absorbed energy to displace hydraulic fluid from the fluid reservoir 232 to the high-pressure accumulator 216, thereby increasing a hydraulic pressure in the accumulator 216. The hydraulic fluid may be a liquid such as oil, for example. When working as a hydraulic motor, the hydraulic machine 214 may displace hydraulic fluid from the high-pressure accumulator 216 to the hydraulic reservoir 232, thereby absorbing hydraulic energy from the high-pressure accumulator 216. The hydraulic machine 214 then converts the absorbed energy into mechanical energy and provides an output torque at the transmission shaft 230, which is then transmitted to the intermediate gear set 226.

The powertrain 4200 further includes a hydraulic displacement control mechanism for controlling the hydraulic displacement of the hydraulic machine 214. The control mechanism comprises a control device 217, an electrically controlled directional valve 215, and a pressure control valve 235. The control device 217 comprises a hydraulic actuator. The hydraulic actuator includes a hydraulic piston, which is mechanically coupled to the moveable swashplate of the hydraulic machine 214. A position of the hydraulic piston controls a swivel angle α of the swashplate with respect to a swivel axis. Through the valve 215, the control device 217 is in fluid communication with the fluid line 240 and with the fluid reservoir 232. The pressure control valve 235 limits a hydraulic pressure applied to the control device 217 from the fluid line 240.

The position of the piston of the control device 217 and thus the hydraulic displacement of the hydraulic machine 214 is controlled through the directional valve 215 by controlling a hydraulic pressure and/or an amount of fluid in fluid chambers 217a, 217b on opposing sides of the piston. The directional valve 215 has four fluid ports and three spool positions. In the first spool position, the directional valve 215 fluidly connects the first fluid chamber 217a of the device 217 to the fluid reservoir 232 and fluidly connects the second fluid chamber 217b of the control device 217 to fluid line 240 through the pressure control valve 235. In the second spool position, the valve 215 fluidly connects both chambers 217a, 217b to the reservoir 232. The second spool position usually corresponds to zero hydraulic displacement of the hydraulic machine 214. In the third spool position, the directional valve 215 fluidly connects the second fluid chamber 217b to the fluid reservoir 232 and fluidly connects the first fluid chamber 217a to the fluid line 240 through the pressure control valve 235.

The hydraulic working assembly 236 mentioned above comprises a hydraulically driven implement 219, a hydraulic working pump 218 for driving the hydraulic implement 219, a fluid reservoir 223 in fluid communication with the working pump 218, and a directional valve 221 for selectively: fluidly separating the implement 219 from the working pump 218 and the fluid line 214, and fluidly connecting the implement 219 to the working pump 218 and the fluid line 241. A transmission shaft 237 of the working pump 218 is selectively drivingly engaged with the ICE 204 and with the torque converter 206 through the mechanical splitter box 260. The splitter box 260 is adapted to selectively drivingly connect at least two of the ICE 204, the working pump 218, and the torque converter 206 with one another. In other words, the working pump 218 may be driven using the ICE 204. Additionally or alternatively, the working pump 218 may be driven using the hydraulic machine 214 by drivingly engaging the hydraulic machine 214 with the working pump 218 through the speed direction changing device 208, the torque converter 206, and the splitter box 260. When coupling the hydraulic machine 214 to the working pump 218 in this manner, mechanical losses can be minimized by engaging the lock-up mechanism of the torque converter 206.

In the example of FIG. 14, the hydraulic implement 219 comprises a hydraulic piston. The hydraulic implement 219 can be part of a lifting mechanism, for example. A position of the piston of the implement 219 can be controlled by controlling a hydraulic pressure and/or an amount of fluid in fluid chambers on opposing sides of the piston.

The directional valve 221 has four fluid ports and three spool positions. In the first spool position, the directional valve 221 fluidly connects the first fluid chamber of the implement 219 to a first fluid port of the working pump 218 and to the fluid line 241 and fluidly connects the second fluid chamber of the implement 219 to the fluid reservoir 223. In the second spool position, the valve 221 fluidly separates the implement 219 from the working pump 218, the fluid line 241 and the reservoir 223. In the third spool position, the directional valve 221 fluidly connects the second fluid chamber of the implement 219 to the first fluid port of the working pump 218 and to the fluid line 241 and fluidly connects the first fluid chamber of the implement 219 to the fluid reservoir 223.

The working pump 218 is adapted to displace hydraulic fluid from the fluid reservoir 223 to the implement 219 for driving the implement 219. The working pump 218 may further be adapted to displace hydraulic fluid from the implement 219 to the reservoir 223.

The hydraulic working assembly 236 is in fluid communication with the high-pressure accumulator 216. The working assembly 236 is selectively fluidly connected to the high-pressure accumulator 216 through the fluid line 241 and through the valves 228a, 228b. Specifically, the working pump 218 is selectively fluidly connected to the accumulator 216 through the fluid line 241 and the valves 228a, 228b. Also, the implement 219 is selectively fluidly connected to the accumulator 216 through the fluid line 241 and the valves 228a, 228b.

The working assembly 236 may operate at hydrostatic pressures up to a maximum operating pressure of the working assembly 236 of 200 bar, for example. On the other hand, the high-pressure accumulator 216 is adapted to operate at hydrostatic pressures up to a maximum operating pressure of the accumulator 216 of at least 300 bar. In other words, the maximum operating pressure of the accumulator 216 is significantly higher than the maximum operating pressure of the working assembly 236. Raising the hydrostatic pressure in the working assembly 236 above the maximum operating pressure of the working assembly 236 may damage the working assembly 236, for example the working pump 218 and/or the implement 219.

When the hydrostatic pressure in the accumulator 216 is below the maximum operating pressure of the working assembly 236, the accumulator 216 may be fluidly connected to the working assembly 236 through the valves 228a, 228b and through the fluid line 241 for driving the implement 219 using hydraulic energy stored in the accumulator 216. The implement 219 may be simultaneously driven by the working pump 218 and the accumulator 216.

When the hydrostatic pressure in the accumulator 216 is below the maximum operating pressure of the working assembly 236, the working assembly 236 may be fluidly connected to the accumulator 216 through the fluid line 241 and the valves 228a, 228b for charging/pressurizing the accumulator 216 through the working pump 218. To this end, the working pump 218 may be driven to displace hydraulic fluid from the reservoir 223 to the accumulator 216, thereby increasing the hydrostatic pressure in the accumulator 216. However, when the working pump 218 is used to pressurize the accumulator 216 in this manner, the hydrostatic pressure in the accumulator 216 may not be increased beyond the maximum operating pressure of the working assembly 236.

The working assembly 236 is furthermore in fluid communication with the hydraulic machine 214. Specifically, the second fluid port of the working pump 218 is fluidly connected to the fluid line 240 through a booster circuit 225. The booster circuit 225 comprises a shut-off valve 231, a pressure control valve 229, and a check valve 227. Check valves are also known as clack valves, one-way valves or non-return valves. The valves 231, 229, 227 are arranged in series, fluidly connecting the fluid line 241 to the fluid line 240. The shut-off valve 231 is adapted to selectively fluidly disconnect the fluid line 240 and the hydraulic machine 214 from the working assembly 236. The check valve 227 is adapted to allow a flow of fluid from the working assembly 236 to the fluid line 240 (and thus to the hydraulic machine 214 and to the pressure control valve 235) when the hydrostatic pressure in the working assembly 236 is above the hydrostatic pressure in the fluid line 240. On the other hand, the check valve 227 is adapted to prevent a flow of fluid from the fluid line 240 to the working assembly 236, in particular when the hydrostatic pressure in the fluid line 240 is above the hydrostatic in the working assembly 236. In this way, the booster circuit 225, and in particular the check valve 227, protects the working assembly 236 from the potentially high pressures in the fluid line 240, in particular when the fluid line 240 is fluidly connected to the high-pressure accumulator 216 through the valves 228a, 228b.

The purpose of the booster circuit 225 is to provide a pilot pressure to the hydraulic machine 214 and/or to the displacement control device 217 when the hydraulic machine 214 and/or the control device 217 are fluidly disconnected from the high-pressure accumulator 216. To this end, the working pump 218 may be driven, preferably by the ICE 204, to displace fluid from the reservoir 223 to the hydraulic machine 214 and/or to the control device 217 through the booster circuit 225 and through the fluid line 240.

The valves 228a, 228b are adapted to selectively one of: isolate the high-pressure accumulator 216 from the working assembly 236 and from the hydraulic machine 214; fluidly connect the accumulator 216 to the working assembly 236 through the fluid line 241; and fluidly connect the accumulator 216 to the hydraulic machine 214.

The powertrain 4200 can be operated according to a number of operational modes.

A first mode of operating the powertrain 4200 provides a method of charging the high-pressure accumulator 216. The method comprises the following steps: disengaging the vehicle output 212 by disengaging the clutch 211; drivingly engaging the ICE 204 with the hydraulic machine 214 through the splitter box 260, the lock-up mechanism of the torque converter 206, and the speed direction changing device 208; fluidly connecting the hydraulic machine 214 to the high-pressure accumulator 216 through the valves 228a, 228h; and transmitting torque from the ICE 204 to the hydraulic machine 214 so that the hydraulic machine displaces hydraulic fluid from the reservoir 232 to the accumulator 216, thereby increasing a hydrostatic pressure in the accumulator 216. In this way, the accumulator 216 may be pressurized up to the maximum operating pressure of the accumulator 216.

According to a second operational mode of the powertrain 4200, hydraulic energy stored in the high-pressure accumulator 216 can be used to provide a torque at the transmission shaft 230 and to transmit this torque to the vehicle output 212 through the stepped-ratio transmission 210 and the clutch 211. In order to convert hydraulic energy stored in the accumulator 216 into a torque provided at the transmission shaft 230, the accumulator 216 is fluidly connected to the hydraulic machine 214 through the valves 228a, 228b so that fluid is displaced from the accumulator 216 to the reservoir 232 through the hydraulic machine 214, thereby driving the hydraulic machine 214. Due to the 4-quadrant nature of the hydraulic machine 214 this operation can be performed both when the vehicle is moving in a forward direction and when the vehicle is moving in a reverse direction.

A third mode of operating the powertrain 4200 provides a method of regenerative braking. During regenerative braking kinetic energy absorbed by the hydraulic machine 214 from the vehicle output 212 is converted into hydraulic energy, which is stored in the accumulator 216. The method comprises the following steps: drivingly engaging the hydraulic machine 214 with the vehicle output 212 through the stepped-ratio transmission 210 and the clutch 211; fluidly connecting the hydraulic machine 214 to the accumulator 216 through the valves 228a, 228b; driving the hydraulic machine by transmitting kinetic energy from the vehicle output 212 to the hydraulic machine 214, thereby braking the vehicle output 212; and using the braking energy absorbed by the hydraulic machine 214 to pump hydraulic fluid from the reservoir 232 to the accumulator 216, thereby increasing the hydraulic pressure in the accumulator 216. Preferably, the method of regenerative braking further includes the step of disengaging the speed direction changing device 208 so that none of the braking energy is transmitted through the speed direction changing device 208. Again, due to the hydraulic machine 214 having both a positive and a negative displacement setting, regenerative braking can be performed both when the vehicle is moving in a forward direction and when the vehicle is moving in a reverse direction.

A fourth mode of operating the powertrain 4200 provides another method of charging the accumulator 216. The method comprises the following steps:

drivingly engaging the ICE 204 with the hydraulic working pump 218 through the splitter box 260; fluidly connecting the hydraulic working pump 218 to the accumulator 216 through the valves 228a, 228h; and transmitting torque from the ICE 204 to the working pump 218 to pump fluid from the reservoir 223 to the accumulator 216, thereby increasing a hydraulic pressure in the accumulator 216. In this manner, the accumulator 216 may be pressurized up to the maximum operating pressure of the working assembly 236 or up to a maximum pressure provided by the working pump 218.

A fifth mode of operating the powertrain 4200 provides a method of driving the hydraulic implement 219 when the hydraulic pressure in the accumulator 216 is below the maximum operating pressure of the working assembly 236. The method includes the following steps: fluidly connecting the high-pressure accumulator 216 to the hydraulic implement 219 through the valves 228a, 228b, 221; and displacing fluid from the high-pressure accumulator 216 to the hydraulic implement 219 for driving the hydraulic implement 219.

A sixth mode of operating the powertrain 4200 provides a method of driving the hydraulic implement 219 when the hydraulic pressure in the accumulator 216 is above the maximum operating pressure of the working assembly 236. The method comprises the following steps: drivingly engaging the hydraulic machine 214 with the working pump 218 through the speed direction changing device 208, the lock-up mechanism of the torque converter 206, and the splitter box 260; fluidly connecting the accumulator 216 to the hydraulic machine 214 through the valve 228a, 228h; fluidly connecting the working pump 218 to the implement 219 through the directional valve 221; displacing fluid from the accumulator 216 to the reservoir 232 through the hydraulic machine 214 to drive the hydraulic machine 214; transmitting torque from the hydraulic machine 214 to the working pump 218; and using the torque transmitted to the working pump 218 to displace fluid from the reservoir 223 to the implement 219 for driving the implement 219.

The method according to the above-described sixth mode of operating the powertrain 4200 may additionally include the steps of: additionally engaging the ICE 204 with the working pump 218 through the splitter box 260 and transmitting torque from the ICE 204 to the working pump 218; drivingly engaging the vehicle output 212 through the clutch 211; transmitting torque from the hydraulic machine 214 to the vehicle output; additionally drivingly engaging the ICE 204 with the vehicle output 212 through the splitter box; and transmitting torque from the ICE 204 to the vehicle output 212. In other words, both the ICE 204 and the hydraulic machine 214 can be employed at the same time to drive both the vehicle output 212 and the hydraulic implement 219. In this configuration, the displacement of the hydraulic machine 214 and the direction clutches of the speed direction changing device 208 must be set such that the ICE 204 and the hydraulic machine 214 cooperate in providing torque to the vehicle output 212 and to the working pump 218.

According to a seventh mode of operating the powertrain 4200, a method of starting the ICE 204 is provided. The method comprises the following steps: disengaging the vehicle output 212 by disengaging the clutch 211; drivingly engaging the hydraulic machine 214 with the ICE 204 through the speed direction changing device 208 and the lock-up mechanism of the torque converter 206; fluidly connecting the high-pressure accumulator 216 to the hydraulic machine through the valves 228a, 228b; driving the hydraulic machine 214 by displacing fluid from the accumulator 216 to the reservoir 232 through the hydraulic machine 214; and transmitting torque from the hydraulic machine 214 to the ICE 204 for starting the ICE 204.

In a first variant of the powertrain 4200 which is not explicitly depicted here, the hydraulic machine 214 only has the properties a), c) and d) and lacks property b). That is, the hydraulic machine 214 may rotate in one direction only. The hydraulic machine 214 of this first variant may be a standard over-center open-circuit pump, for example. In this first variant, a mechanical shuttling device is additionally provided between the hydraulic machine 214 and the intermediate gear set 226 or between the transmission shaft 230 of the hydraulic machine 214 and the intermediate gear set 226. The shuttling device provides mechanical coupling between the unidirectional hydraulic machine 214 and the intermediate gear set 226 and is adapted to maintain the correct rotational direction on the hydraulic machine 214 independently of the direction of rotation of an input of the shuttling device coupled to the intermediate gear set 226, e.g. an intermediate shaft of the intermediate gear set 226. In combination with the described shuttling device, a unidirectional hydraulic machine provides the same functionalities as a 4-quadrant machine. In regard to the mechanical coupling of the hydraulic machine 214 to the transmission, the first variant of the powertrain 4200 is similar to the powertrain 500 of FIG. 5 having the shuttling device 556. Otherwise, the first variant of the powertrain 4200 may include the same features and functionalities as the embodiment shown in FIG. 14.

In a second variant of the powertrain 4200 of FIG. 14 which is likewise not explicitly depicted here, the hydraulic machine 214 only has the properties a), c) and d) as in the first variant, and the hydraulic machine 214 is selectively drivingly engaged with the intermediate gear set 226 through a disconnection device, for example a clutch. The disconnection device allows disconnecting the hydraulic machine 214 from the transmission. Thus, as opposed to the first variant, the second variant allows hybrid operations in only one direction of motion of the vehicle. In regard to the mechanical coupling of the hydraulic machine 214 to the transmission, the second variant of the powertrain 4200 is similar to the powertrain 600 of FIG. 6 having the disconnection device 664. Otherwise, the second variant of the powertrain 4200 may include the same features and functionalities as the embodiment shown in FIG. 14.

FIG. 15 shows another hydraulic hybrid powertrain 5200. The powertrain 5200 of FIG. 15 is a variant of the previously described powertrain 4200 of FIG. 14. As before, features of the powertrain 5200 which are identical to corresponding features of the embodiments described above are designated with the same reference signs.

The driveline of the powertrain 5200 of FIG. 15 is identical to the driveline of the powertrain 4200 of FIG. 14, the driveline of the powertrain 5200 comprising an ICE 204, a splitter box 260, a torque converter 206 including a lock-up mechanism (not shown), a speed direction changing device 208 including a forward and a reverse direction clutch, an intermediate gear set 226, and a stepped-ratio transmission 210 selectively drivingly engaged with a vehicle output 212 through a clutch 211.

A working hydraulic assembly 236 of the powertrain 5200 is identical to the corresponding working hydraulic assembly of the powertrain 4200 of FIG. 14, the working hydraulic assembly 236 of the powertrain 5200 of FIG. 15 comprising a working pump 218 drivingly engaged with the splitter box 260 through a transmission shaft 237, a hydraulic implement 219, a fluid reservoir 223 and a directional valve 221. Like the powertrain 4200 of FIG. 14, the powertrain 5200 of FIG. 15 further includes a hydraulic machine 214 as a secondary machine, the hydraulic machine 214 being in driving engagement with the intermediate gear set 226 through a transmission shaft 230, and the hydraulic machine 214 being in fluid communication with a hydraulic accumulator assembly. As in the powertrain 4200 of FIG. 14, the working assembly 236 of the powertrain 5200 of FIG. 15 is in fluid communication with the hydraulic accumulator assembly and with the hydraulic machine 214.

The hydraulic machine 214 of the powertrain 5200 of FIG. 15 differs from the hydraulic machine of the powertrain 4200 in that it only has the properties a), b), and d) defined above and does not have the property c). In other words, the hydraulic displacement of the hydraulic machine 214 of the powertrain 5200 may only be varied in either the positive range or the negative range. However, the hydraulic machine 214 of the powertrain 5200 is adapted to provide the same functionality as a 4-quadrant machine. To this end, the accumulator assembly of the powertrain 5200 comprises a high-pressure accumulator 250 and a low-pressure accumulator 252, which are in fluid communication with the hydraulic machine 214 through a number of valves 244a-f. The valves 244a-f are adapted to selectively: fluidly separate at least one of the accumulators 250, 252 from the hydraulic machine 214; fluidly connect the high-pressure accumulator 250 to a first fluid port of the hydraulic machine 214 and fluidly connect the low-pressure accumulator 252 to a second fluid port of the hydraulic machine 214; and fluidly connect the high-pressure accumulator 250 to the second fluid port of the hydraulic machine 214 and fluidly connect the low-pressure accumulator 252 to the first fluid port of the hydraulic machine 214. Thus, the valves 244a-f function in a similar way as the valve 444 of the powertrain 400 of FIG. 4 and as the valve 244 of the powertrain 2200 of FIGS. 11A-C. That is, for a given direction of rotation of the transmission shaft 230 the hydraulic machine 214 can be used to either displace hydraulic fluid from the high-pressure accumulator 250 to the low-pressure accumulator 252 or vice versa. In other words, for each direction of rotation of the transmission shaft 230 the hydraulic machine 214 can add torque to the transmission shaft 230 by displacing fluid from the high-pressure accumulator 250 to the low-pressure accumulator 252 (thereby discharging the accumulator assembly), or the hydraulic machine can absorb torque from the transmission shaft 230 by displacing fluid from the low-pressure accumulator 252 to the high-pressure accumulator 250 (thereby charging the accumulator assembly).

The valves 244a-c are adapted to selectively: fluidly separate the high-pressure accumulator 250 from the hydraulic machine 214; fluidly connect the high-pressure accumulator 250 to the first fluid port of the hydraulic machine 214 through a fluid line 240 and, at the same time, fluidly separate the high-pressure accumulator 250 from the second fluid port of the hydraulic machine 214; and fluidly connect the high-pressure accumulator 250 to the second fluid port of the hydraulic machine 214 through a fluid line 242 and, at the same time, fluidly separate the high pressure accumulator 250 from the first fluid port of the hydraulic machine 214. Similarly, the valves 244d-f are adapted to selectively: fluidly separate the low-pressure accumulator 252 from the hydraulic machine 214; fluidly connect the low-pressure accumulator 252 to the first fluid port of the hydraulic machine 214 through the fluid line 240 and, at the same time, fluidly separate the low-pressure accumulator 252 from the second fluid port of the hydraulic machine 214; and to fluidly connect the low-pressure accumulator 252 to the second fluid port of the hydraulic machine 214 through the fluid line 242 and, at the same time, fluidly separate the low-pressure accumulator 252 from the first fluid port of the hydraulic machine 214.

The valves 244a and 244d each have three fluid ports and two spool positions. The valves 244b, 244c, 244e, and 244f are configured as simple shut-off valves, each having two fluid ports and two spool positions. When the valve 244a is in the first spool position, as shown in FIG. 15, the valve 244a provides fluid communication between the high-pressure accumulator 250 and the hydraulic machine 214 through the valves 244b, 244c. When the valve 244a is in the second spool position, it fluidly separates the high-pressure accumulator 250 from the hydraulic machine 214 and fluidly connects the high-pressure accumulator 250 to the working assembly 236 through a fluid line 241. Similarly, when the valve 244d is in the first spool position, as shown in FIG. 15, it provides fluid communication between the low-pressure accumulator 252 and the hydraulic machine 214 through the valves 244e, 244f. When the valve 244d is in the second spool position, it fluidly separates the low-pressure accumulator 252 from the hydraulic machine 214 and fluidly connects the low-pressure accumulator 252 to the working assembly 236 through the fluid line 241. When in their first spool position, the shut-off valves 244b, 244c, 244e, and 244f allow a fluid flow between their fluid ports, respectively. When in their second spool position, the shut-off valves 244b, 244c, 244e, and 244f fluidly separate their fluid ports from one another, respectively, thereby shutting off a fluid flow through the valve (as shown in FIG. 15).

The high-pressure accumulator 250 can be fluidly connected to the first fluid port of the hydraulic machine 214 and fluidly separated from the second fluid port of the hydraulic machine 214 by switching the valve 244a to its first spool position, the valve 244b to its first spool position, and the valve 244c to its second spool position. The high-pressure accumulator 250 can be fluidly connected to the second fluid port of the hydraulic machine 214 and fluidly separated from the first fluid port of the hydraulic machine 214 by switching the valve 244a to its first spool position, the valve 244b to its second spool position, and the valve 244c to its first spool position.

Similarly, the low-pressure accumulator 252 can be fluidly connected to the first fluid port of the hydraulic machine 214 and fluidly separated from the second fluid port of the hydraulic machine 214 by switching the valve 244d to its first spool position, the valve 244e to its first spool position, and the valve 244f to its second spool position. The low-pressure accumulator 252 can be fluidly connected to the second fluid port of the hydraulic machine 214 and fluidly separated from the first fluid port of the hydraulic machine 214 by switching the valve 244d to its first spool position, the valve 244e to its second spool position, and the valve 244f to its first spool position.

To a skilled person it is readily apparent that the valves 244b, 244c could be replaced by any other combination of valves that provide the same functionality as the valves 244b, 244c. For example, the valves 244b, 244c could be replaced by single 3/3 way valve which selectively provides: fluid separation from the hydraulic machine 214; fluid connection to the first fluid port of the hydraulic machine 214 and, at the same time, fluid separation from the second fluid port of the hydraulic machine 214; and fluid connection to the second fluid port of the hydraulic machine 214 and, at the same time, fluid separation from the first fluid port of the hydraulic machine 214. The valves 244e, 244f could be replaced by a single 3/3 way valve in the same manner, mutatis mutandis.

As already mentioned, the hydraulic working assembly 236 of the powertrain 5200 is in fluid communication with the accumulator assembly comprising the accumulators 250, 252 through the fluid line 241. When the valve 244a is in the first spool position (as shown in FIG. 15), the valve 244a fluidly separates the high-pressure accumulator 250 from the working assembly 236. When the valve 244a is in the second spool position, the high-pressure accumulator 250 is fluidly connected to the working assembly 236 through the fluid line 241. Similarly, when the valve 244d is in the first spool position (as shown in FIG. 15), the valve 244d fluidly separates the low-pressure accumulator 252 from the working assembly 236. When the valve 244d is in the second spool position, the valve 244d fluidly connects the low-pressure accumulator 252 to the hydraulic working assembly 236 through the fluid line 241.

As in the powertrain 4200 of FIG. 14, the working assembly 236 of the powertrain 5200 of FIG. 15 is in fluid communication with the hydraulic machine 214 through the fluid line 241 and a booster circuit 225. The booster circuit 225 comprises a shut-off valve 231, a pressure control valve 229, and a shut-off valve 227. Again, the valves 231, 229, 227 are arranged in series. The booster circuit 225 is fluidly connected to the fluid line 240 (and to the first fluid port of the hydraulic machine 214) through a check valve 243a. Like the check valve 227, the check valve 243a allows a flow of fluid from the working assembly 236 to the fluid line 240 (and to the first fluid port of the hydraulic machine 214) and prevents a flow of fluid from the fluid line 240 to the working assembly 236, in particular when the fluid line 240 is fluidly connected to either of the accumulators 250, 252 through the valves 244b, 244c, 244e, 244f.

The booster circuit 225 is fluidly connected to the fluid line 242 (and to the second fluid port of the hydraulic machine) through a check valve 243b. The check valve 243b allows a flow of fluid from the working assembly 236 to the fluid line 242 (and to the second fluid port of the hydraulic machine 214) and prevents a flow of fluid from the fluid line 242 to the working assembly 236, in particular when the fluid line 242 is fluidly connected to either of the accumulators 250, 252 through the valves 244b, 244c, 244e, 244f.

As in the powertrain 4200, the hydraulic displacement of the hydraulic machine 214 of the powertrain 5200 of FIG. 15 is controlled through a displacement control device 217 including a hydraulic piston. The piston of the device 217 may be actuated by switching an electronically controlled directional valve 215. The valve 215 is adapted to control a hydraulic pressure and an amount of fluid in fluid chambers arranged on opposing sides of the piston of the displacement control device 217. The control device 217 is in fluid communication with the fluid lines 240, 242 through corresponding check valves. The booster circuit 225 is adapted to provide a pilot pressure to the hydraulic machine 214 and to the displacement control device 217, in particular when the hydraulic machine 214 and/or the control device 217 are fluidly separated from the accumulators 250, 252. The pilot pressure may be provided by the working pump 218. For providing the pilot pressure, the working pump 218 may displace fluid from the reservoir 223 to the hydraulic machine 214 and/or to the control device 217 through the booster circuit 225.

Like the powertrain 4200 of FIG. 14, the powertrain 5200 of FIG. 15 can be operated according to a number of operational modes.

A first mode of operating the powertrain 5200 provides a method of charging the high-pressure accumulator 250. This method comprises the following steps: disengaging the vehicle output 212 by disengaging or unlocking the clutch 211; drivingly engaging the ICE 204 with the hydraulic machine 214 through the splitter box 260, the lock-up mechanism of the torque converter 206, the speed direction changing device 208, the intermediate gear set 226, and the transmission shaft 230; fluidly connecting the first fluid port of the hydraulic machine 214 to the high-pressure accumulator 250 through the fluid line 240 and the valves 244a, 244h; and transmitting torque from the ICE 204 to the hydraulic machine 214 so that the hydraulic machine 214 displaces hydraulic fluid to the high pressure accumulator 250, thereby increasing a hydrostatic pressure in the high pressure accumulator 250.

The fluid displaced to the high pressure accumulator 250 may be fed by the working pump 218. The ICE 204 then drives the working pump 218 to pump fluid from the fluid reservoir 223 of the working assembly 236 through the booster circuit 225, the check valve 243b and the fluid line 242 to the second fluid port of the hydraulic machine 214. Alternatively, the fluid displaced to the high pressure accumulator 250 may be fed by the low pressure accumulator 252. The low pressure accumulator 252 is then fluidly connected to the second fluid port of the hydraulic machine 214 through the valves 244d, 244f and the fluid line 242.

In this way, the high pressure accumulator 250 may be pressurized up to the maximum operating pressure of the high pressure accumulator 250 which may be at least 300 bar or at least 400 bar.

In a variation of the first mode of operating the powertrain 5200, the ICE 204 may drive the hydraulic machine 214 as described above to displace fluid to the low pressure accumulator 252. To this end, the low pressure accumulator 252 is fluidly connected to the first fluid port of the hydraulic machine 214 through the valves 244d, 244e and the fluid line 240, and the high pressure accumulator 250 is fluidly separated from the hydraulic machine 214, for example by switching the valves 244b, 244c to their second spool position, respectively. The fluid displaced to the low pressure accumulator 252 is then fed to the second fluid port of the hydraulic machine 214 through the working pump 218 as described above.

According to a second operational mode of the powertrain 5200, hydraulic energy stored in the accumulator assembly in the form of a pressure gradient between the high pressure accumulator 250 and the low pressure accumulator 252 can be used to provide a torque at the transmission shaft 230 of the hydraulic machine 214 and to transmit this torque to the vehicle output 212 through the stepped-ratio transmission 210 and the clutch 211. In order to convert hydraulic energy stored in the accumulator assembly into a torque provided at the transmission shaft 230, the accumulators 250, 252 are fluidly connected to the first and the second fluid port of the hydraulic machine 214 (or vice versa), respectively, so that fluid is displaced from the high pressure accumulator 250 to the low pressure accumulator 252 through the hydraulic machine 214, thereby driving the hydraulic machine 214. Depending on the fluid connection of the accumulators 250, 252 to the fluid ports of the hydraulic machine 214, the vehicle output 212 may be driven in the forward or in the reverse direction.

A third operational mode of the powertrain 5200 provides a method of regenerative braking. During regenerative braking kinetic energy absorbed by the hydraulic machine 214 from the vehicle output 212 is converted into hydraulic energy, which is stored in the accumulator assembly. The method comprises the following steps: drivingly engaging the hydraulic machine 214 with the vehicle output 212 through the stepped-ratio transmission 210 and the clutch 211; fluidly connecting the first and the second fluid port of the hydraulic machine 214 to the accumulators 250, 252, respectively (or vice versa); driving the hydraulic machine 214 by transmitting kinetic energy from the vehicle output 212 to the hydraulic machine 214, thereby braking the vehicle output 212; and using the braking energy absorbed by the hydraulic machine 214 to pump hydraulic fluid from the low pressure accumulator 252 to the high pressure accumulator 250. Preferably, the method of regenerative braking further includes the step of disengaging the speed direction changing device 208 so that none of the braking energy is transmitted through the speed direction changing device 208. Again, depending on the fluid connection of the accumulators 250, 252 to the fluid ports of the hydraulic machine 214, regenerative braking may be performed during vehicle movement in the forward direction and in the reverse direction.

A fourth mode of operating the powertrain 5200 provides another method of charging the high pressure accumulator 250 (or, alternatively, the low pressure accumulator 252). The method comprises the following steps: drivingly engaging the ICE 204 with the hydraulic working pump 218 through the splitter box 260; fluidly connecting the hydraulic working pump 218 to the high pressure accumulator 250 through the valve 244a (or to the low pressure accumulator 252 through the valve 244d); and transmitting torque from the ICE 204 to the working pump 218 for pumping fluid from the reservoir 223 to the high pressure accumulator 250 (or to the low pressure accumulator 252), thereby increasing a hydraulic pressure in the high pressure accumulator 250 (or in the low pressure accumulator 252). In this manner, the high pressure accumulator 250 (or the low pressure accumulator 252) may be pressurized up to the maximum operating pressure of the working assembly 236 or up to a maximum pressure provided by the working pump 218.

A fifth mode of operating the powertrain 5200 provides a method of driving the hydraulic implement 219 when the hydraulic pressure in the high pressure accumulator 250 (or, alternatively, in the low pressure accumulator 252) is below the maximum operating pressure of the working assembly 236. The method includes the following steps: fluidly connecting the high-pressure accumulator 250 (or the low pressure accumulator 252) to the hydraulic implement 219 through the valves 244a, 221 (or through the valves 244d, 221); and displacing fluid from the high-pressure accumulator 250 (or from the low pressure accumulator 252) to the hydraulic implement 219 for driving the hydraulic implement 219.

A sixth mode of operating the powertrain 5200 provides another method of driving the hydraulic implement 219, in particular when the hydrostatic pressure in the accumulators 250, 252 is above the maximum operating pressure of the working assembly 236. The method comprises the following steps: drivingly engaging the hydraulic machine 214 with the working pump 218 through the transmission shaft 230, the intermediate gear set 226, the speed direction changing device 208, the lock-up mechanism of the torque converter 206, and the splitter box 260; fluidly connecting the accumulators 250, 252 to the first and the second fluid port of the hydraulic machine 214, respectively (or vice versa, depending on the setting of the speed direction changing device 208); fluidly connecting the working pump 218 to the implement 219 through the valve 221; displacing fluid from the high pressure accumulator 250 to the low pressure accumulator 252 through the hydraulic machine 214 to drive the hydraulic machine 214; transmitting torque from the hydraulic machine 214 to the working pump 218; and using the torque transmitted to the working pump 218 to displace fluid from the reservoir 223 to the implement 219 for driving the implement 219.

The method according to the above-described sixth mode of operating the powertrain 5200 may additionally include the steps of: engaging the ICE 204 with the working pump 218 through the splitter box 260 and additionally transmitting torque from the ICE 204 to the working pump 218; drivingly engaging the stepped-ratio transmission 210 with the vehicle output through the clutch 211; transmitting torque from the hydraulic machine 214 to the vehicle output through the transmission shaft 230, the intermediate gear set 226, the stepped-ratio transmission 210, and the clutch 211; drivingly engaging the ICE 204 with the vehicle output 212 through the splitter box, the lock-up mechanism of the torque converter 206, the speed direction changing device 208, the stepped-ratio transmission 210, and the clutch 211; and transmitting torque from the ICE 204 to the vehicle output 212. In other words, both the ICE 204 and the hydraulic machine 214 can be employed at the same time to drive both the vehicle output 212 and the hydraulic implement 219. In this configuration, the fluid connections between the accumulators 250, 252 and the fluid ports of the hydraulic machine 214 and the engagement of the direction clutches of the speed direction changing device 208 must be configured such that the ICE 204 and the hydraulic machine 214 cooperate in providing torque to the vehicle output 212 and to the working pump 218.

According to a seventh mode of operating the powertrain 5200, a method of starting the ICE 204 is provided. The method comprises the following steps: disengaging the vehicle output 212 by disengaging the clutch 211; drivingly engaging the hydraulic machine 214 with the ICE 204; fluidly connecting the accumulators 250, 252 to the first and the second fluid port of the hydraulic machine, respectively (or vice versa, depending on the configuration of the speed direction changing device 208); driving the hydraulic machine 214 by displacing fluid from the high pressure accumulator 250 to the low pressure accumulator 252 through the hydraulic machine 214; and transmitting torque from the hydraulic machine 214 to the ICE 204 for starting the ICE 204.

The invention claimed is:

1. A hydraulic hybrid powertrain for a vehicle, comprising:
an internal combustion engine selectively drivingly engaged with an input of a stepped-ratio transmission, an output of the stepped-ratio transmission being selectively drivingly engaged with a vehicle output;
an intermediate gear set drivingly engaged with the input of the stepped-ratio transmission;
a hydraulic machine in fluid communication with a hydraulic accumulator assembly, a transmission shaft of the hydraulic machine being drivingly engaged or selectively drivingly engaged with the intermediate gear set for providing energy to the intermediate gear set and for absorbing energy from the intermediate gear set, wherein the hydraulic machine has a variable hydraulic displacement for regulating an amount of torque applied to the intermediate gear set; and
a displacement control device for controlling the displacement of the hydraulic machine, the displacement control device comprising a hydraulic actuator and at least one electric valve for controlling a position of the hydraulic actuator, wherein the displacement control device is in fluid communication with a hydraulic circuit comprising the accumulator assembly and the hydraulic machine.

2. The hydraulic hybrid powertrain of claim 1, wherein the hydraulic machine
is adapted to rotate in a clockwise direction and in a counter-clockwise direction; and
has a positive and a negative hydraulic displacement setting for changing, for a given direction of rotation of the transmission shaft of the hydraulic machine, a direction of flow of a hydraulic fluid flowing through the hydraulic machine.

3. The hydraulic hybrid powertrain of claim 2, further comprising at least one electric valve for controlling the hydraulic displacement of the hydraulic machine.

4. The hydraulic hybrid powertrain of claim 1, further comprising a fluid reservoir in fluid communication with the hydraulic machine, wherein the hydraulic machine is adapted to displace hydraulic fluid from the hydraulic accumulator assembly to the fluid reservoir and to displace hydraulic fluid from the fluid reservoir to the hydraulic accumulator assembly.

5. The hydraulic hybrid powertrain of claim 1, wherein the hydraulic accumulator assembly comprises a high pressure accumulator in fluid communication with the hydraulic machine and a low pressure accumulator in fluid communication with the hydraulic machine, wherein the hydraulic machine is adapted to displace hydraulic fluid from the high pressure accumulator to the low pressure accumulator and to displace hydraulic fluid from the low pressure accumulator to the high pressure accumulator.

6. The hydraulic hybrid powertrain of claim 5, wherein the high pressure accumulator and the low pressure accumulator are fluidly connected to the hydraulic machine through at least one valve, the valve being adapted to selectively
fluidly separate at least one of the high pressure accumulator and the low pressure accumulator from the hydraulic machine,
fluidly connect a first fluid port of the hydraulic machine to the high pressure accumulator and fluidly connect a second fluid port of the hydraulic machine to the low pressure accumulator, and fluidly connect the first fluid port of the hydraulic machine to the low pressure accumulator and fluidly connect the second fluid port of the hydraulic machine to the high pressure accumulator.

7. The hydraulic hybrid powertrain of claim 1, further comprising:
a hydraulic implement; and
a hydraulic working pump for driving the hydraulic implement, a transmission shaft of the hydraulic working pump being drivingly engaged or selectively drivingly engaged with an output shaft of the internal combustion engine;
wherein the hydraulic working pump is in fluid communication with the hydraulic accumulator assembly for pressurizing the hydraulic accumulator assembly; and
wherein the hydraulic accumulator assembly is in fluid communication with the hydraulic implement for driving the hydraulic implement.

8. The hydraulic hybrid powertrain of claim 7, further comprising a mechanical splitter box adapted to at least one of:
selectively drivingly engage the output shaft of the internal combustion engine with the transmission shaft of the hydraulic working pump;
selectively drivingly engage the output shaft of the internal combustion engine the input of the stepped-ratio transmission; and
selectively drivingly engage the input of the stepped-ratio transmission with the transmission shaft of the hydraulic working pump.

9. The hydraulic hybrid powertrain of claim 1, further comprising a torque converter selectively drivingly engaging the internal combustion engine with the input of the stepped-ratio transmission, wherein the torque converter comprises a mechanical lock-up mechanism adapted to selectively lock an impeller portion of the torque converter to a turbine portion of the torque converter.

10. The hydraulic hybrid powertrain of claim 1, further comprising a hydraulic pressure booster circuit in fluid communication with a fluid reservoir and in fluid communication with the hydraulic machine, the booster circuit being adapted to provide a pilot pressure to the hydraulic machine, in particular when the hydraulic machine is fluidly disconnected from the hydraulic accumulator assembly.

11. A method of regeneratively braking a vehicle output of a hydraulic hybrid powertrain, the method comprising the steps of:
providing a hydraulic hybrid powertrain, the hydraulic hybrid powertrain comprising:
a stepped-ratio transmission, an output of the stepped-ratio transmission being selectively drivingly engaged with a vehicle output; and
a hydraulic machine in fluid communication with a hydraulic accumulator assembly, the hydraulic machine being drivingly engaged or selectively drivingly engaged with the input of the stepped-ratio transmission;
the method further comprising the steps of:
drivingly engaging the hydraulic machine with the vehicle output and fluidly connecting the hydraulic machine to the hydraulic accumulator assembly;
driving the hydraulic machine by transmitting kinetic energy from the vehicle output to the hydraulic machine, thereby braking the vehicle output; and
at least partially converting the braking energy into hydraulic energy using the hydraulic machine and storing the hydraulic energy in the hydraulic accumulator assembly.

12. A method of charging a hydraulic accumulator assembly of a hydraulic hybrid powertrain, the method comprising the steps of:
providing a hydraulic hybrid powertrain, the hydraulic hybrid powertrain comprising:
an internal combustion engine selectively drivingly engaged with an input of a stepped-ratio transmission, an output of the stepped-ratio transmission being selectively drivingly engaged with a vehicle output; and
a hydraulic machine in fluid communication with a hydraulic accumulator assembly, the hydraulic machine being drivingly engaged or selectively drivingly engaged with the input of the stepped-ratio transmission;
the method further comprising the steps of:
disengaging the vehicle output, drivingly engaging the internal combustion engine with the hydraulic machine, and fluidly connecting the hydraulic machine to the hydraulic accumulator assembly; and
transmitting torque from the internal combustion engine to the hydraulic machine and using the torque transmitted from the internal combustion engine to the hydraulic machine to charge the hydraulic accumulator assembly.

13. A method of charging a hydraulic accumulator assembly of a hydraulic hybrid powertrain, the method comprising the steps of:
providing a hydraulic hybrid powertrain, the hydraulic hybrid powertrain comprising:
an internal combustion engine selectively drivingly engaged with an input of a stepped-ratio transmission, an output of the stepped-ratio transmission being selectively drivingly engaged with a vehicle output;
a hydraulic machine in fluid communication with a hydraulic accumulator assembly, the hydraulic machine being drivingly engaged or selectively drivingly engaged with the input of the stepped-ratio transmission; and
a hydraulic working pump for driving a hydraulic implement, the hydraulic working pump being drivingly engaged or selectively drivingly engaged with the internal combustion engine, and the hydraulic working pump being selectively fluidly connected with the hydraulic accumulator assembly for pressurizing the hydraulic accumulator assembly;
the method further comprising the steps of:
drivingly engaging the internal combustion engine with the hydraulic working pump and fluidly connecting the hydraulic working pump with the hydraulic accumulator assembly; and
transmitting torque from the internal combustion engine to the working pump and using the torque transmitted from the internal combustion engine to the working pump to charge the hydraulic accumulator assembly.

14. A method of starting an internal combustion engine of a hydraulic hybrid powertrain, the method comprising the steps of:
providing a hydraulic hybrid powertrain, the hydraulic hybrid powertrain comprising:
an internal combustion engine selectively drivingly engaged with an input of a stepped-ratio transmission, an output of the stepped-ratio transmission being selectively drivingly engaged with a vehicle output; and a hydraulic machine in fluid communication with a hydraulic accumulator assembly, the hydraulic machine being drivingly engaged or selectively drivingly engaged with the input of the stepped ratio transmission;

the method further comprising the steps of:

disengaging the vehicle output, drivingly engaging the hydraulic machine with the internal combustion engine, and fluidly connecting the hydraulic accumulator assembly with the hydraulic machine; and driving the hydraulic machine using hydraulic energy stored in the hydraulic accumulator assembly and starting the internal combustion engine through the hydraulic machine.

15. A method of driving a hydraulic implement of a hydraulic hybrid powertrain, the method comprising the steps of:

providing a hydraulic hybrid powertrain, the hydraulic hybrid powertrain comprising:

an internal combustion engine selectively drivingly engaged with an input of a stepped-ratio transmission, an output of the stepped-ratio transmission being selectively drivingly engaged with a vehicle output;

a hydraulic machine in fluid communication with a hydraulic accumulator assembly, the hydraulic machine being drivingly engaged or selectively drivingly engaged with the input of the stepped ratio transmission;

a hydraulic implement, wherein the hydraulic accumulator assembly is selectively fluidly connected with the hydraulic implement for driving the hydraulic implement;

a hydraulic working pump for driving the hydraulic implement, wherein the hydraulic working pump is selectively drivingly engaged with the internal combustion engine and wherein the hydraulic working pump is selectively fluidly connected with the hydraulic accumulator assembly for pressurizing the hydraulic accumulator assembly; and a mechanical splitter box configured to at least one of: selectively drivingly engage the internal combustion engine with the hydraulic working pump, selectively drivingly engage the internal combustion engine with the hydraulic machine, and selectively drivingly engage the hydraulic machine with the hydraulic working pump;

the method further comprising the steps of:

if a hydrostatic pressure in the hydraulic accumulator assembly is below a threshold pressure:

fluidly connecting the hydraulic accumulator assembly with the hydraulic implement; and driving the hydraulic implement using hydraulic energy stored in the hydraulic accumulator assembly;

if the hydrostatic pressure in the hydraulic accumulator assembly is above the threshold pressure:

drivingly engaging the hydraulic machine with the hydraulic working pump through the splitter box, and fluidly connecting the hydraulic accumulator assembly with the hydraulic machine; and driving the hydraulic implement through the hydraulic machine and through the hydraulic working pump using hydraulic energy stored in the hydraulic accumulator assembly.

* * * * *